(12) United States Patent
Yang

(10) Patent No.: US 11,177,473 B2
(45) Date of Patent: Nov. 16, 2021

(54) SELF-STANDING TIN SULFIDE FILM FOR FLEXIBLE BATTERIES

(71) Applicant: University of Central Florida Research Foundation, Inc., Orlando, FL (US)

(72) Inventor: Yang Yang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/929,608

(22) Filed: May 12, 2020

(65) Prior Publication Data

US 2020/0274157 A1 Aug. 27, 2020

Related U.S. Application Data

(63) Continuation of application No. PCT/US2020/015038, filed on Jan. 24, 2020.
(Continued)

(51) Int. Cl.
*H01M 4/00* (2006.01)
*H01M 4/38* (2006.01)
(Continued)

(52) U.S. Cl.
CPC ......... *H01M 4/387* (2013.01); *H01M 10/054* (2013.01); *H01M 10/3972* (2013.01)

(58) Field of Classification Search
CPC ............. H01M 10/3972; H01M 4/044; H01M 2004/021; H01M 10/058; H01M 4/387
See application file for complete search history.

(56) References Cited

U.S. PATENT DOCUMENTS

| 8,940,442 B2 | 1/2015 | Fukumine et al. |
| 2011/0236756 A1* | 9/2011 | Joo ........................ H01M 4/661 429/220 |

FOREIGN PATENT DOCUMENTS

WO 2018053499 A1 3/2018

OTHER PUBLICATIONS

Liu et al., In situ reduction and coating of SnS2 nanobelts for free-standing SnS@ polypyrrole-nanobelt/carbon-nanotube paper electrodes with superior Li-ion storage, J Mater Chem. A. 2015. vol. 3: 5259-5265.
(Continued)

*Primary Examiner* — Cynthia H Kelly
*Assistant Examiner* — Monique M Wills
(74) *Attorney, Agent, or Firm* — Smith & Hopen, P.A.; Paul Murty

(57) ABSTRACT

High-performance flexible batteries are promising energy storage devices for portable and wearable electronics. The major obstacle to develop flexible batteries is the shortage of flexible electrodes with excellent electrochemical performance. Another challenge is the limited progress in the flexible batteries beyond Li-ion because of safety concerns for the Li-based electrochemical system. Accordingly, a self-supported tin sulfide (SnS) porous film (PF) was fabricated as a flexible cathode material in Al-ion battery, which delivers a high specific capacity of 406 mAh/g. A capacity decay rate of 0.03% per cycle was achieved, indicating a good stability. The self-supported and flexible SnS film also shows an outstanding electrochemical performance and stability during dynamic and static bending tests. Microscopic images demonstrated that the porous structure of SnS is beneficial for minimizing the volume expansion during charge/discharge. This leads to an improved structural stability and superior long-term cyclability.

15 Claims, 18 Drawing Sheets

Related U.S. Application Data

(60) Provisional application No. 62/797,004, filed on Jan. 25, 2019.

(51) Int. Cl.
*H01M 10/054* (2010.01)
*H01M 10/39* (2006.01)

(56) References Cited

OTHER PUBLICATIONS

Sinsermsuksakul et al., Atomic Layer Deposition of Tin Monosulfide Thin Films. Adv. Energy Mater. 2011, vol. 1, 1116-1125.
Liang et al., Self-Supported Tin Sulfide Porous Films for Flexible Aluminum-Ion Batteries. Adv. Energy Mater. 2018: 1802543.
International Search Report and Written Opinion for PCT/US20/15038 (filing date: Jan. 24, 2020) dated Apr. 23, 2020; Applicant: University of Central Florida Research Foundation, Inc.
Zhu et al., A general strategy to fabricate carbon-coated 3D porous interconnected metal sulfides: case study of SnS/C nanocomposite for high-performance lithium and sodium ion batteries. Adv. Sci. 2015. vol. 2: 1500200.
Deng et al., Solution Synthesis of Ultrathin Single-Crystalline SnS Nanoribbons for Photodetectors via Phase Transition and Surface Processing, ACS Nano. 2012. vol. 6 (No. 7): 6197-6207.
Zhang et al., Ultralarge single crystal SnS rectangular nanosheets†. Chem. Commun. 2011. vol. 47. 5226-5228.
Zhou et al., Enhanced Sodium-Ion Battery Performance by Structural Phase Transition from Two-Dimensional Hexagonal-SnS2 to Orthorhombic-SnS, ACS Nano. 2014. vol. 8 (No. 8): 8323-8333.
Nassary. Temperature dependence of the electrical conductivity, Hall effect and thermoelectric power of SnS single crystals J. Alloys Compd. 2005. vol. 398: 21-25.
Song et al., A long-life rechargeable Al ion battery based on molten salts J. Mater. Chem. A. 2017. vol. 5: 1282.
Hu et al., An Innovative Freeze-Dried Reduced Graphene Oxide Supported SnS2 Cathode Active Material for Aluminum-Ion Batteries. Adv. Mater. 2017. vol. 29: 1606132.
Wang et al., Aqueous Rechargeable Zinc/Aluminum Ion Battery with Good Cycling Performance ACS Appl. Mater. Interfaces. 2016. vol. 8: 9022-9029.
Li et al., 2D hybrid anode based on SnS nanosheet bonded with graphene to enhance electrochemical performance for lithium-ion batteries. RSC Adv. 2015. vol. 5. 46941.
International Preliminary Report on Patentability for PCT/US2020/015038 (filing date: Jan. 24, 2020) dated Aug. 5, 2021; Applicant: University of Central Florida Research Foundation, Inc.

\* cited by examiner

SELF-STANDING TIN SULFIDE FILM FOR FLEXIBLE BATTERIES

CROSS-REFERENCE TO RELATED APPLICATIONS

This nonprovisional application is a continuation of and claims priority to international application No. PCT/US2020/015038, entitled "Self-standing tin sulfide film for flexible batteries," filed Jan. 24, 2020, by the same inventor, which is a continuation of and claims priority to provisional application No. 62/797,004, entitled "Self-standing tin sulfide film for flexible batteries," filed Jan. 25, 2019, by the same inventor.

BACKGROUND OF THE INVENTION

1. Field of the Invention

This invention relates, generally, to flexible batteries. More specifically, it relates to a self-standing tin sulfide film that can be used in combination with flexible batteries, contributing to stable flexible batteries.

2. Brief Description of the Prior Art

Since the development of the first commercial lithium-ion batteries (LIBs) in 1990, LIBs have been widely used for portable electronic devices, electric grids, and electric vehicles. [1, 2, 3]. However, the shortage of lithium sources and safety concerns, such as hazardous gas release, represent critical challenges for the sharply-increasing battery market. [4]. There is a need to develop new battery systems with high energy density, long lifespan, and an absence of safety issues. Recently, many new battery systems based on the earth-abundant metals have been developed, such as magnesium-ion batteries and aluminum-ion batteries (AIBs). [5, 6, 7]. Among them, AIBs provide three electrons during the $Al^{3+}/Al$ oxidation-reduction (redox) reactions, delivering a high gravimetric capacity of 2,980 mAh/g. [8]. Moreover, the price of aluminum metal is much cheaper than that of lithium metal, such that aluminum-based batteries include lower production costs as compared with lithium-based batteries. [3]. Additionally, aluminum metal electrodes are stable in open air under ambient conditions, which is easier for battery manufacturing as compared to lithium metal. Therefore, AIBs are considered as a promising candidate for large-scale energy storage.

However, research progress into the viability of AIBs has been severely limited by developing new electrodes and electrolytes for the batteries. A key challenge is the sluggish $Al^{3+}$ ion diffusion in the host materials during electrochemical charge/discharge processes. Monovalent ions, such as $Li^+$ and $Na^+$, could be easily inserted into and extracted from the host materials with a simultaneous charge-transfer. [9]. Owing to the three-electron transfer process in the charge/discharge reactions, the strong bonding between $Al^{3+}$ and the host materials would lead to slow diffusion kinetics in the host structures. In recent decades, aqueous electrolytes have been employed in AIBs, however, which deliver low discharge voltage and poor cell efficiency. [10]. For example, Liu et al. developed copper hexacyanoferrate nanoparticles as cathode materials for AIBs in 0.5 M $Al_2(SO_4)_3$ aqueous electrolyte, exhibiting a low potential window of 0.2-1.2 V (as compared to SCE, or saturated calomel electrode, an example of an aqueous electrode) and poor capacity retention of 54.9% after 1,000 cycles. [9]. Very recently, ionic-liquid (IL) electrolyte was explored to replace aqueous electrolyte in AIBs. [8, 11]. For example, Wang et al. designed an AIB using pristine natural graphite flakes as an electrode with $AlCl_3$/[EMIm]Cl (aluminum chloride and 1-ethyl-3-methylimidazolium chloride) as an electrolyte, achieving a high specific capacity of 110 mAh/g and Coulombic efficiency of 98%. [8]. However, the obtained capacity was far below the theoretical capacity. Therefore, there is a need to develop new electrode materials with high specific capacity and good cyclability.

Tin sulfides have attracted great attention as active materials for lithium-ion and sodium-ion batteries. [12]. In particular, tin monosulfide (SnS, also called herzenbergite) is an important mineral on earth, which is chemically stable in the presence of water and oxygen. In addition, SnS is a typical layered material with a large interlayer spacing of 0.43 nm, which is available for the intercalation of alkali metal ions and compensation of the volume expansion during the charge/discharge process. [13]. The layers of SnS are coupled by weak van der Waals forces, which are beneficial for reversible alkali metal ions storage. [14]. Moreover, SnS presents excellent electric conductivities of 0.193 S/cm (siemens per centimeter) in parallel to the basal plane and 0.063 S/cm in perpendicular to the basal plane. [15].

Conventionally, carbonaceous materials and organic binders are widely employed in the fabrication of powder materials-based battery electrodes, which have low volumetric capacities and cannot meet the requirement for flexible energy storage. Moreover, the conventional powder-based electrodes are coated on the current collectors, which is impossible for flexible electronic devices. Accordingly, what is needed is a self-supported SnS porous film (PF) as a new type of electrode material for rechargeable AIBs, which can be implemented in flexible electronics devices. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a flexible but structurally self-supported and safe battery cathode is now met by a new, useful, and nonobvious invention.

The novel method includes steps of forming a flexible electrode and improving aluminum-ion battery performance. The steps include electrochemically depositing a tin (Sn) film onto a polished Sn foil for a predetermined length of time, such as approximately six hours. In an embodiment, the polished Sn foil has a current density of 25 mA/cm$^2$. Next, the method includes a step of removing the electrochemically deposited Sn film from the polished Sn foil, such that the electrochemically deposited Sn film is a self-supported Sn film. The method further includes a step of performing an electrochemical anodic treatment of the self-supported Sn film, the treatment including the steps of subjecting the self-supported Sn film to a constant voltage, such as approximately nine volts, for a period of approximately thirty minutes. As such, a self-supported tin oxide (SnO$_2$) porous film is formed from the self-supported Sn film. Next, the method includes a step of performing a chemical vapor deposition treatment on the self-supported SnO$_2$ porous film, the treatment including the steps of disposing the self-supported SnO$_2$ porous film in an atmosphere of sulfur (S) for a period of approximately thirty minutes. As such, a self-supported tin (II) sulfide (SnS) porous film is formed from the self-supported SnO$_2$ porous film. In an embodiment, the formed self-supported SnS porous film has a thickness in a range of 0.1-100, and an electrical conductivity of 0.606 S/cm. In an embodiment, the method includes a step of disposing the self-supported SnS porous film within a non-rigid aluminum-ion battery as an electrode. The ion diffusion within the aluminum-ion battery is faster than ion-diffusion within aluminum-ion batteries without the SnS porous film, and the non-rigidity of the aluminum-ion battery is such that the battery is capable of flexing, such as by being bent to 90°.

In an embodiment, the step of electrochemically depositing a tin (Sn) film onto a polished Sn foil for a predetermined length of time may further include forming an aqueous solution as a medium within which electrochemical deposit occurs. In an embodiment, the step of electrochemically depositing a tin (Sn) film onto a polished Sn foil for a predetermined length of time further comprises forming a two-electrode deposition system including the polished Sn foil as a cathode and a Sn plate as an anode. The step of performing a chemical vapor deposition treatment on the self-supported SnO$_2$ porous film may further include forming an upstream heating zone and a downstream heating zone, disposing an amount of sulfur powder at the upstream heating zone, and disposing the self-supported SnO$_2$ porous film at the downstream heating zone. The upstream heating zone may be heated to 150° C., and the downstream heating zone may be heated to 350° C.

The novel structure includes a non-rigid aluminum-ion battery including a tin (II) sulfide (SnS) porous film as an electrode within the aluminum-ion battery. The SnS porous film has a reversible specific capacity of 406 mAh/g, such that ion diffusion within the aluminum-ion battery is faster than ion-diffusion within aluminum-ion batteries without the SnS porous film. The non-rigidity of the aluminum-ion battery is such that the battery is capable of flexing. In an embodiment, the SnS porous film has a thickness of approximately 2.3 μm. In an embodiment, each of the non-rigid aluminum-ion battery and the SnS porous film is bent to 90°.

An object of the invention is to provide a flexible battery made of a safe material, which is coated with a flexible but structurally self-supported material to be used as a cathode within the battery.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a self-supported SnS porous film (PF) as a new type of electrode material for rechargeable and flexible AIB s. An anodization treatment is used in the synthetic process in order to form a highly porous and sponge-like structure, which offers an adequate active surface area and short ion diffusion pathway for the electrochemical reactions. Moreover, the porous and layered structure of SnS may be helpful to buffer the volume expansion during charge/discharge, which can successfully improve the structural stability to achieve an excellent cyclability. As a consequence, the as-prepared SnS PF electrode shows a high reversible specific capacity of 406 mAh/g for AIB s. With a current density of 100 mA/g, the electrode shows a capacity decay rate of 0.03% per cycle, indicating an excellent stability.

Figure 4:
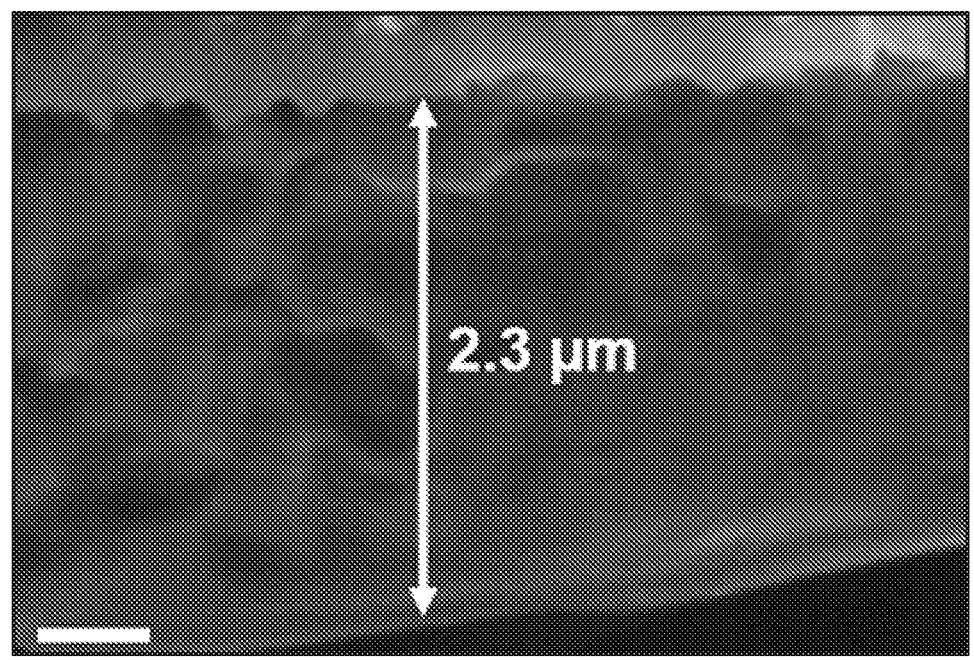
FIG. 4 is a cross-sectional scanning electron microscopy image of SnS porous film, with the scale bar denoting 500 nm.

In an embodiment of the present invention, a self-supported SnS porous film was synthesized by electrochemically depositing an Sn film onto a polished Sn foil having a current density of 25 mA/cm$^2$ for six hours. Then, the deposited Sn film was removed from the substrate, resulting in a self-supported Sn film. After that, electrochemical anodic treatment was performed on the self-supported Sn film with a constant voltage of 9V for 30 minutes to convert the metallic Sn film to a self-supported SnO$_2$ porous film. Finally, a chemical vapor deposition (CVD) treatment in a sulfur atmosphere was conducted for 30 min to form SnS. In a typical process, a 2.3 µm thick self-supported Sn film was prepared (see FIG. 4). The as-prepared bulk SnS materials showed significantly improved electrical conductivity of 0.606 S/cm, which is much higher than values reported in the prior art. [15].

Figure 1A:
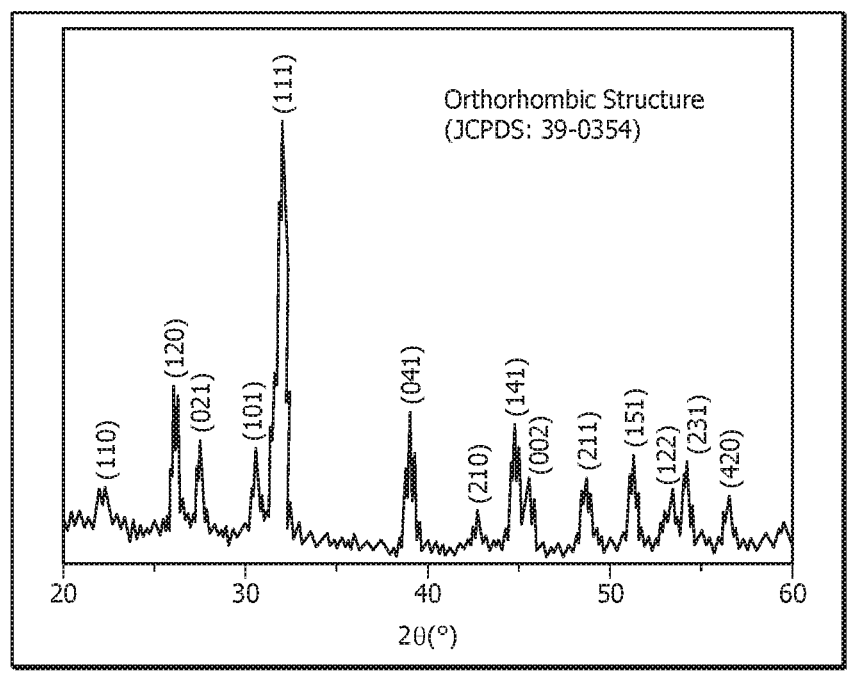
FIG. 1A is an x-ray diffraction pattern of a SnS (tin (II) sulfide) porous film.
Figure 5:
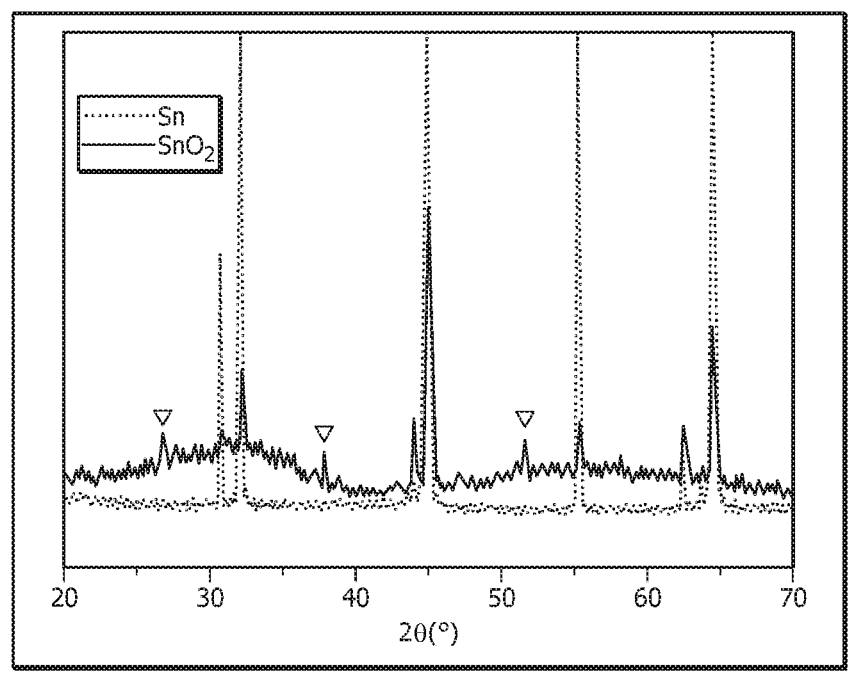
FIG. 5 is a graph showing x-ray diffraction patterns of Sn foil before and after anodic treatment.
Figure 6A:
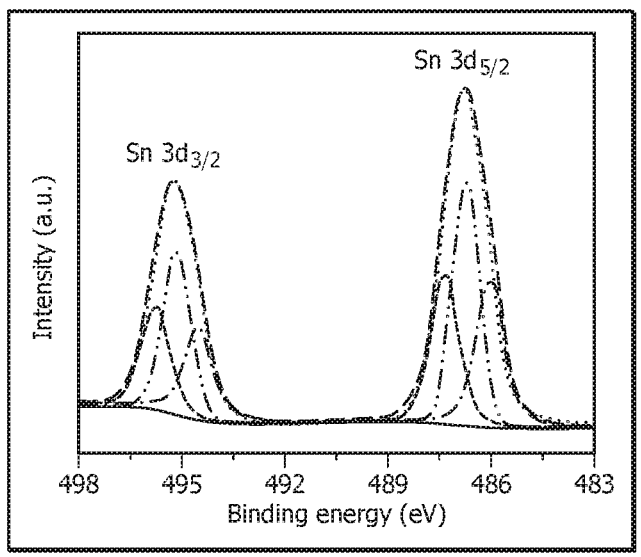
FIG. 6A is a graph showing the X-ray photoelectron spectroscopy (XPS) profiled of the Sn deposit at a pristine state.
Figure 6B:
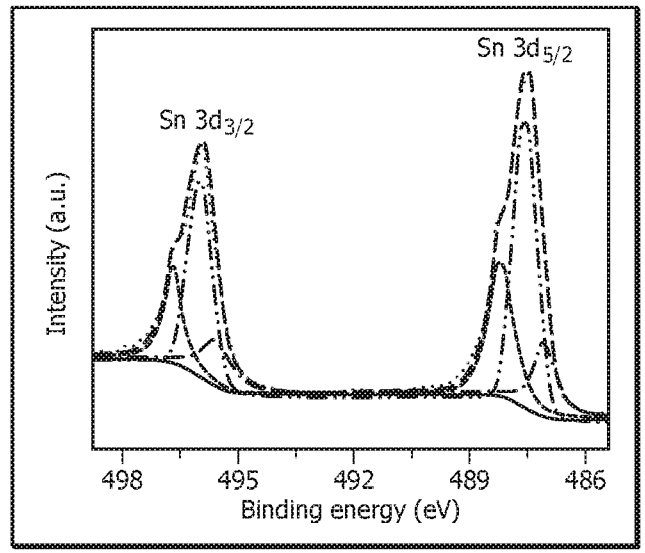
FIG. 6B is a graph showing the XPS profiled of the Sn deposit at a charged state at 2.4 V.
Figure 6C:
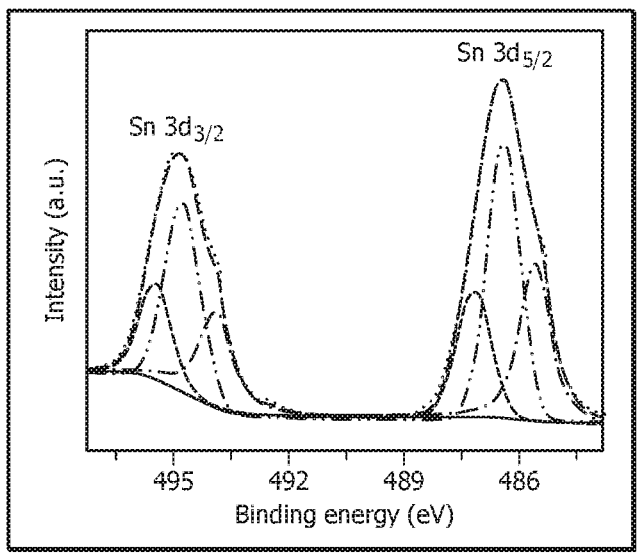
FIG. 6C is a graph showing the XPS profiled of the Sn deposit at a discharged state at 0.5 V.
Figure 6D:
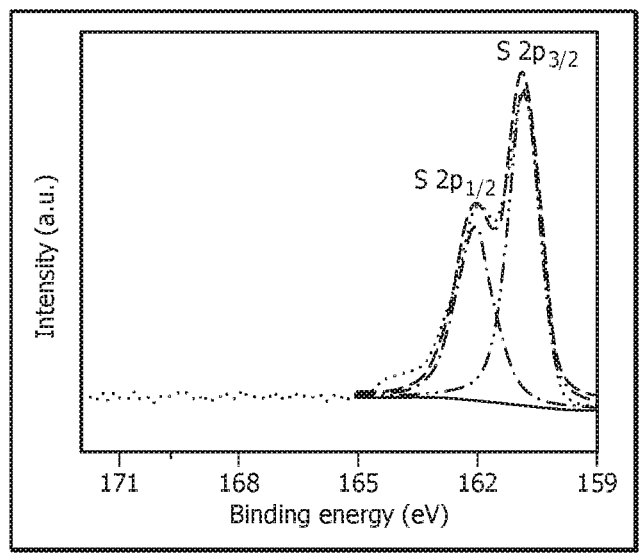
FIG. 6D is a graph showing the XPS profiled of the Sn deposit at a pristine state, similar to the graph of FIG. 6A.
Figure 6E:
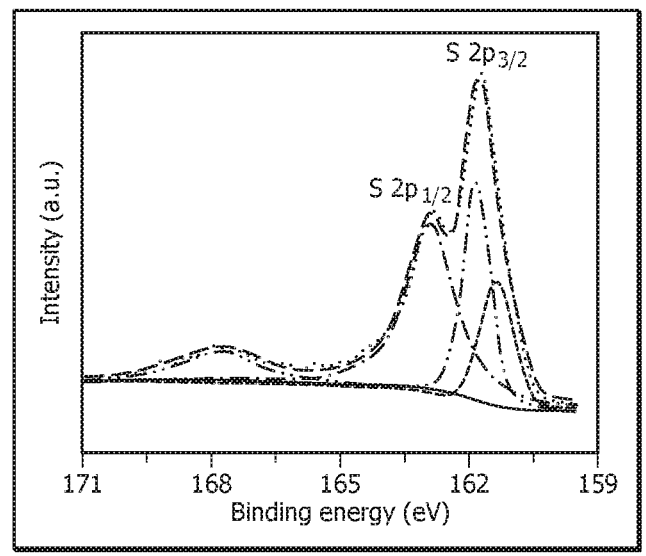
FIG. 6E is a graph showing the XPS profiled of the Sn deposit at a charged state at 2.4 V, similar to the graph of FIG. 6B.
Figure 6F:
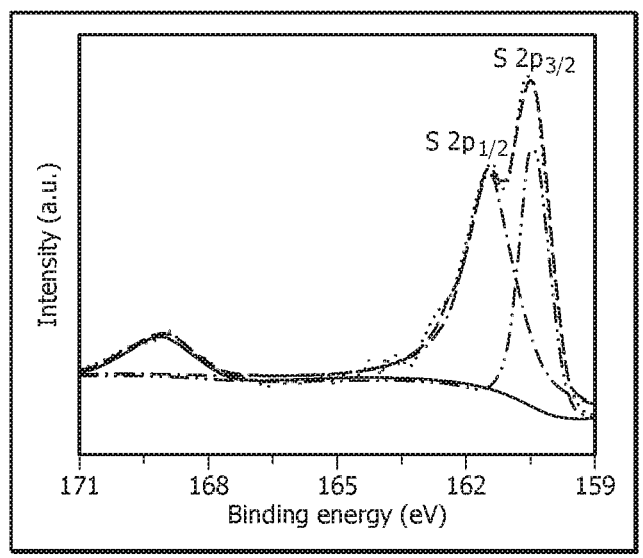
FIG. 6F is a graph showing the XPS profiled of the Sn deposit at a discharged state at 0.5 V, similar to the graph of FIG. 6C.

The residual metal-framework within the porous structure formed seamless contact with active materials to construct a conductive framework, drastically improving electrode conductivity. The thickness of the film can be adjusted by controlling the electrodeposition time. X-ray diffraction (XRD) (see FIG. 1A, and FIG. 5) was conducted to analyze the composition of the as-prepared Sn, SnO$_2$ and SnS films. As shown in FIG. 5, the main product after anodizing the Sn film is SnO$_2$, which can be used as a precursor to form SnS by CVD treatment. In addition, metallic Sn peaks were also observed from the anodized Sn samples, indicating residual Sn frameworks remained in the porous film. Grazing-incidence XRD patterns (see FIG. 1A) show a characteristic herzenbergite orthorhombic phase of SnS in the porous film (compared with standard card JCPDS No. 39-0354). [16].

Figure 1B:
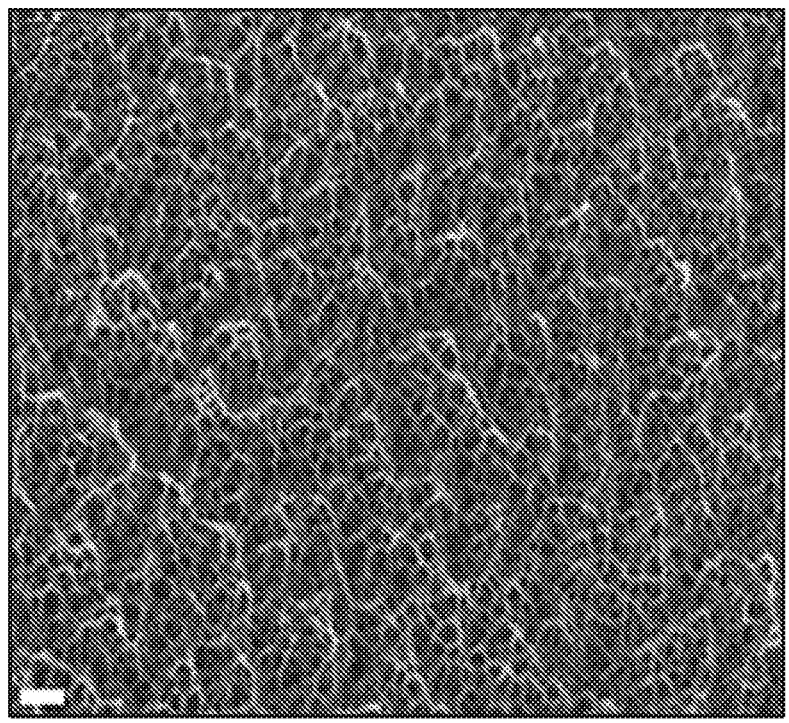
FIG. 1B is a top-view scanning electron microscopy (SEM) image of the SnS porous film of FIG. 1A, the bar representing a scale of 100 nm.
Figure 1C:
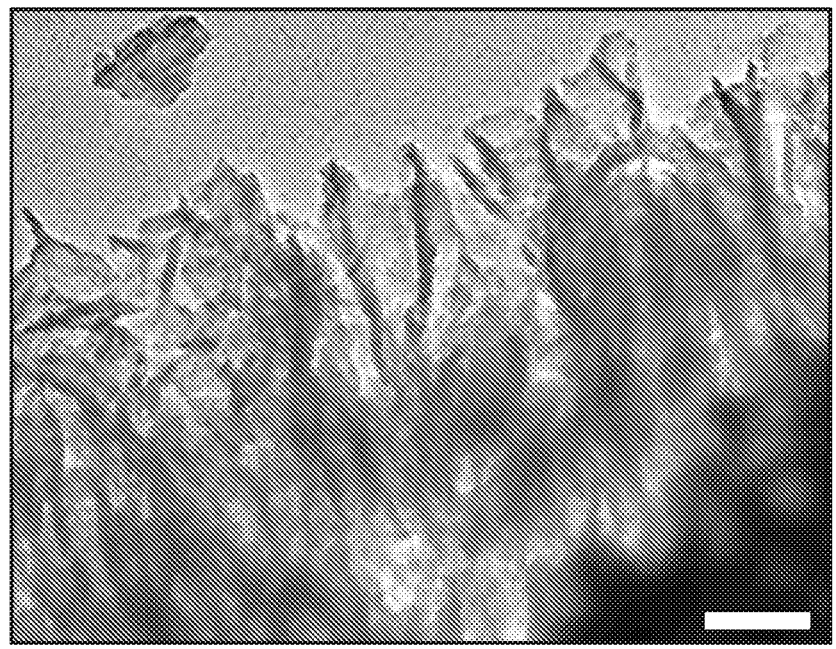
FIG. 1C is a transition electron microscopy (TEM) image of the SnS porous film of FIG. 1A, the bar representing a scale of 50 nm.
Figure 1D:
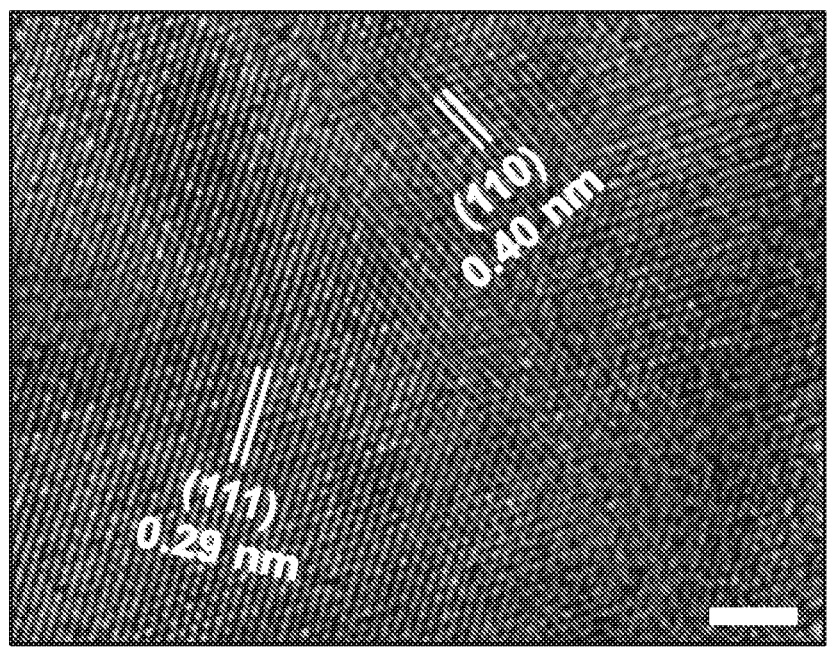
FIG. 1D is a high resolution TEM image of the SnS porous film of FIG. 1A, the bar representing a scale of 5 nm.

The calculated interlayer spacing of SnS is about 0.40 nm, which is much larger than Al$^{3+}$ (0.067 nm). [17]. No other diffraction peaks were observed, indicating a complete conversion from SnO$_2$ to SnS by CVD sulfurization treatment without forming secondary phase and impurity. A highly porous structure with pores sizes in a range of 50-100 nm was observed from the scanning electron microscopy (SEM) (see FIG. 1B) image of SnS PF. The porous morphology and crystalline structure were further examined by transmission electron microscopy (TEM). As exhibited in FIG. 1C, the SnS PF shows a highly porous and layered structure, which provides an open channel for the ion diffusion and more surface area for electrochemical reactions. The crystalline structure was checked by high-resolution TEM, as illustrated in FIG. 1D. The lattice fringes with spacings of 0.40 nm and 0.29 nm are indexed as (110) and (111) planes of SnS, respectively.

Figure 2A:
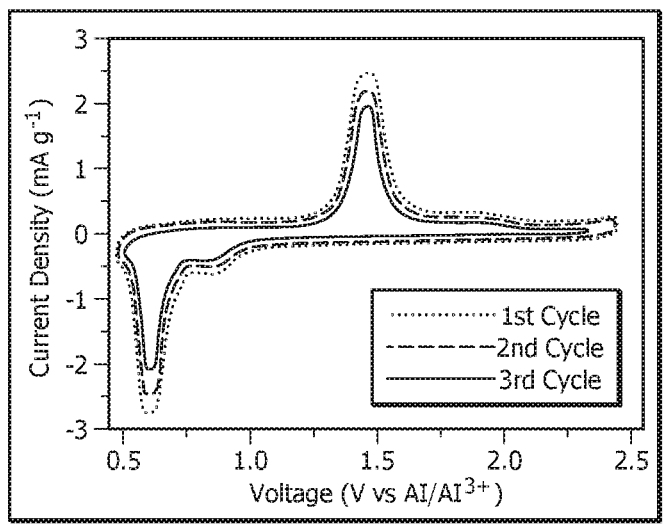
FIG. 2A is a graph showing cyclic voltammograms for the first three cycles at a scan rate of 0.5 mV/s.

A flexible pouch cell was assembled to evaluate the electrochemical performance of SnS PF for rechargeable AIBs. Cyclic voltammetry (CV) at a scan rate of 0.1 mV/s was conducted to test electrochemical behavior in a voltage window of 0.5-2.42 V (vs Al/Al$^{3+}$). As shown in FIG. 2A, a pair of sharp cathodic/anodic peaks at around 1.45 V and 0.6 V can be found in the initial three cycles. Moreover, two broad peaks located at 1.9 V and 0.9 V can be observed. The shapes of the CV curves remain almost unchanged in the first three charge/discharge processes, indicating the electrochemical reaction was highly reversible. [18].

Figure 2B:
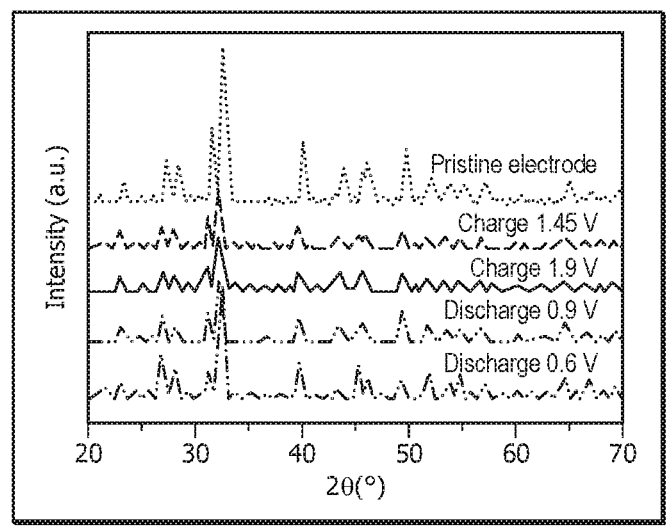
FIG. 2B is a graph showing ex-situ X-ray powder diffraction (XRD) patterns collected at different charge/discharge potentials.

To further investigate the electrochemical process during charge/discharge, ex-situ x-ray diffraction tests of SnS PF were performed at different charge/discharge potentials (see FIG. 2B). In the corresponding CV curves, all the peaks remain unchanged during the charge/discharge process, confirming reversible and stable performance. However, the intensities of XRD peaks gradually decrease during charging, suggesting a weakened boundary due to intercalation of chloroaluminate anions. [19]. Moreover, obvious shifts to small angles were observed during the charging process, owing to the boundary reforming. [20, 21]. By contrast, the intensities of XRD peaks increase during discharging, indicating the extraction of the intercalated chloroaluminate anions out of the SnS interlayers. [22]. Eventually, the XRD patterns returned to levels near the initial state at the discharge potential of 0.6 V, indicating a reversible electrochemical process.

Figure 7:
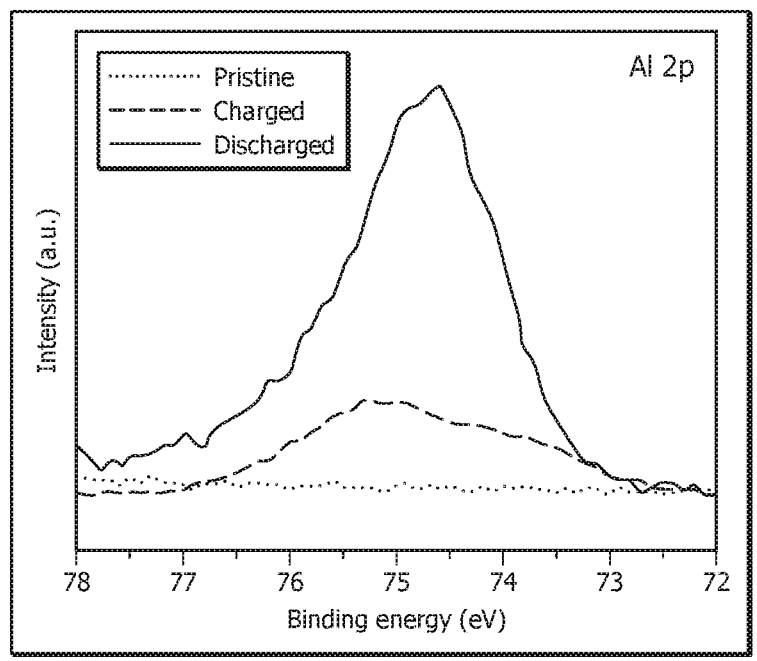
FIG. 7 is a graph showing the XPS profile of Al 2p electron subshell spectra of the electrode at pristine, charged (2.4 V), and discharged (0.5 V) states.

X-ray photoelectron spectroscopy (XPS) was performed to further elucidate the electrochemical mechanism. The XPS profiles of Sn and S in a pristine state, charged at 2.4 V, and discharged at 0.5 V, are shown in FIGS. 6A-F. The major doublet peaks at 486.8 eV and 495.3 eV of the pristine sample are consistent with the $3d_{5/2}$ and $3d_{3/2}$ peaks of Sn in FIG. 6A. [23]. After discharging, the spectra of Sn shifted to low binding energy and more molar ratio of metallic Sn can be observed in the electrode. This result indicates that the aluminum compounds transfer into the layered SnS materials, corresponding to higher aluminum concentration after discharging, as shown in FIG. 7. However, after charging, the major peaks shifted to higher binding energy (487.2 eV and 495.7 eV), demonstrating the increase of the oxidation state of Sn. This variation of binding energy is due to the decomposition of aluminum compounds after charging.

On the other side, the XPS spectra of sulfur present a similar shift in the pristine state, discharged state, and charged state. After discharging, the 2p spectra of sulfur shifted toward lower binding energy by 0.4 eV, reflecting the decrease of the valence state of sulfur. [20]. Similarly, after charging, the spectra of sulfur recovered to the pristine state with a higher binding energy increases, revealing a reversible reaction to increase the valence state of sulfur. It is clearly observed that a small satellite peak of $S^{6+}$ is located around 168 eV after charging and discharging, owing to the oxidation of $S^{2-,\ during\ the\ reaction.}$ [20, 24]. An unknown peak around 161.5 eV was found after charging, which is similar to the result using $SnS_2$ as the active material in AIBs. [20]. Further characterization is required to understand this new peak in the future.

Based on the above discussion, it can be concluded that tin and sulfur changed valance states to balance the charge variation during the aluminum compounds insertion and extraction. The variations of tin and sulfur valence states agree with the ex-situ XRD results, which can significantly improve the reversibility and stability. [25]. In summary, the variation of the metallic valence state and the sulfur valence state are reported in other metal sulfide materials as AIBs, respectively. [7, 20, 24, 26, 27]. It is noted that this is the first time finding the variations of metallic and sulfur valence state in one AIB system.

Based on the above discussion, the proposed electrochemical process during charging/discharging processes is as follows. In the charging process, the anode is:

$$4Al_2Cl_7^- + 3e^- \rightarrow 7AlCl_4^- + Al$$

The cathode is:

$$SnS + nAlCl_4^- \rightarrow ne^- + SnS[AlCl_4]_n$$

In the discharge process, the anode is:

$$7AlCl_4^- + Al \rightarrow 4Al_2Cl_7^- + 3e^-$$

The cathode is:

$$SnS[AlCl_4]_n + ne^- \rightarrow SnS + nAlCl_4^-$$

Galvanostatic charge-discharge tests at different charge/discharge current densities were performed to investigate the electrochemical behavior of SnS PF. As displayed in FIG. 2B, only one plateau can be observed in the discharge curves, demonstrating fast electrochemical kinetics. [28]. At a current density of 20 mA/g, the SnS PF delivers a specific capacity of 406 mAh/g, which is larger than those of $SnS_2$ (392 mAh/g) and $Ni_3S_2$ (350 mAh/g) electrodes for AIBs. A detailed comparison with the state-of-the-art AIBs is shown in Table 1 below. [18, 20].

TABLE 1

Specific capacities for different Al-ion battery systems

| Electrode | Electrolyte | Specific capacity (mAh/g) | Reference |
|---|---|---|---|
| SnS porous film | $AlCl_3$/[EMIm]Cl | 406 | Instant application |
| $Ni_3S_2$/graphene | $AlCl_3$/[EMIm]Cl | 350 | [7] |
| Graphite | $AlCl_3$/[EMIm]Cl | 110 | [8] |
| Carbon paper | $AlCl_3$/[EMIm]Cl | 90 | [30] |
| Graphene nanoribbons | $AlCl_3$/[EMIm]Cl | 123 | [31] |
| $Li_3VO_4$@C | $AlCl_3$/[EMIm]Cl | 137 | [32] |
| Graphene film | $AlCl_3$/[EMIm]Cl | 85 ± 3 | [33] |
| Graphene aerogel | $AlCl_3$/[EMIm]Cl | 95 | [34] |
| $WO_{3-x}$ | $AlCl_3$/[EMIm]Cl | 120 | [35] |
| $MO_{2.5+y}VO_{9+z}$ | $AlCl_3$/[EMIm]Cl | 340 | [36] |
| $SnS_2$/rGO | $AlCl_3$/[EMIm]Cl | 392 | [20] |
| CuHCF nanoparticles | $Al_2(SO_4)_3$ | 69.2 | [9] |
| $TiO_2$ nanoleaves | $Al(NO_3)_3$ | 141.3 | [10] |
| $TiO_2$ nanotube | $AlCl_3$ | 75 | [10] |
| Graphite | $NaAlCl_4$ | 190 | [19] |

Figure 2C:
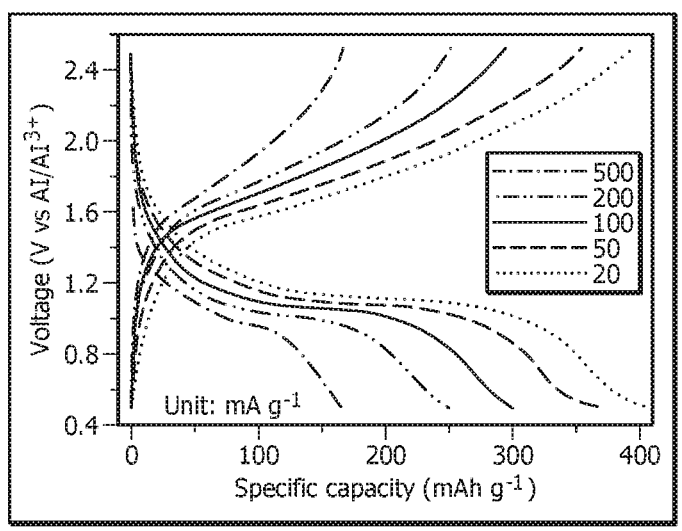
FIG. 2C is a graph showing galvanostatic charge/discharge profiles at different current densities.
Figure 2D:
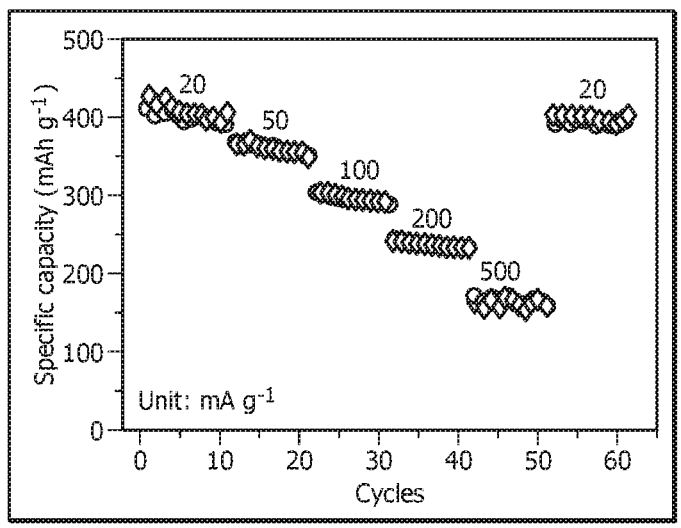
FIG. 2D is a graph showing the rate capability of SnS porous film (PF) electrode.
Figure 8:
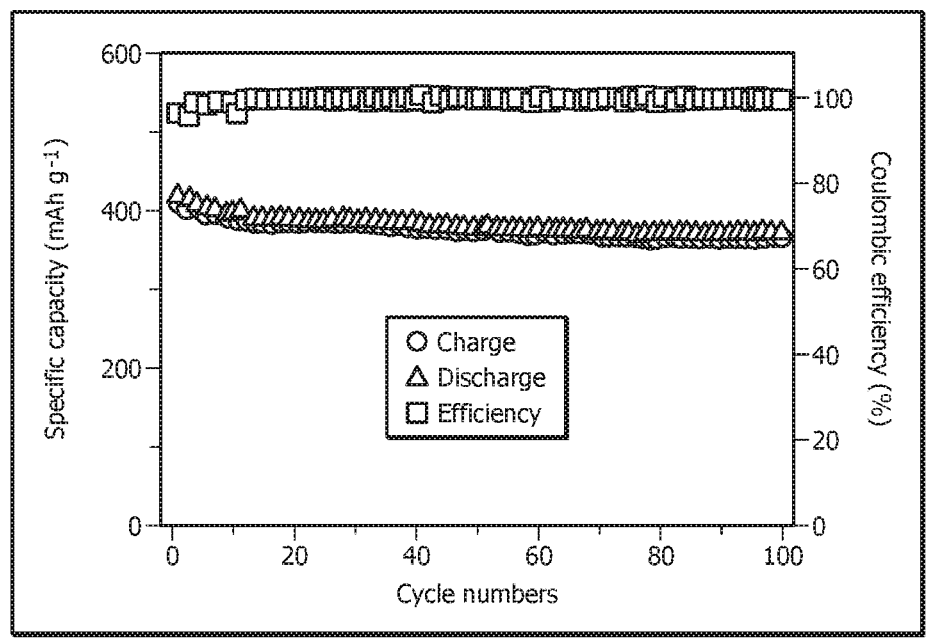
FIG. 8 is a graph showing the long-term cycling performance at a current density of 20 mA/g.

The discharge plateau and capacity slightly decrease with increasing current densities, owing to the improved ion diffusion within the highly porous structure of SnS PF. [2]. The rate capability at different current densities presented in FIG. 2C shows a high specific capacity of 406 mAh/g in the initial cycle at a current density of 20 mA/g. The specific capacity decreases from 406 mAh/g to 160.5 mAh/g with the current densities increasing from 20 mA/g to 500 mA/g. The capacity retention is estimated to be about 40%. However, the specific capacity can retrieve up to 395 mAh/g when the current density decreases to 20 mA/g, as shown in FIG. 2D, demonstrating the excellent capability and reversible electrochemical process. This is due to the porous and layered structure of SnS PF with short ion diffusion pathway. The Coulombic efficiency at high current density is higher than that at low current density, suggesting a promising candidate for fast charge/discharge AIB s. The SnS PF delivers a capacity of 370 mAh/g at 20 mA/g after 100 charge/discharge cycles, indicating 91% capacity retention (see FIG. 8).

Figure 2E:
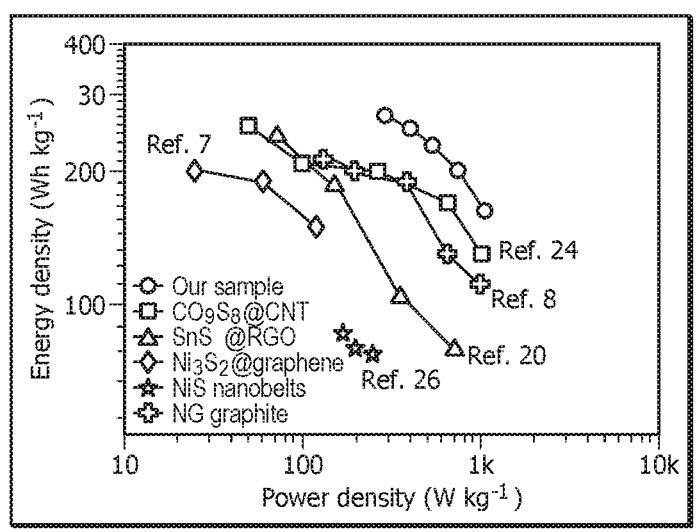
FIG. 2E is a graph showing a Ragone plot of a SnS PF electrode and other similar metal sulfides systems.
Figure 2F:
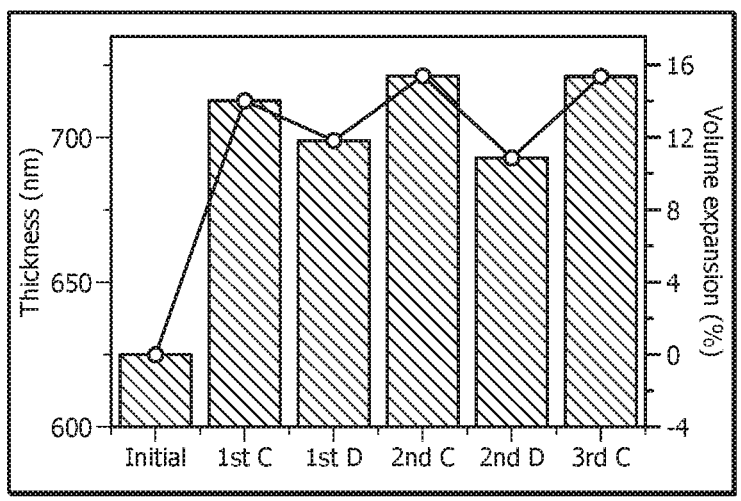
FIG. 2F is a graph showing the volume expansion derived from in-situ TEM analysis, with the letter C denoting the charge process and the letter D denoting the discharge process.
Figure 2G:
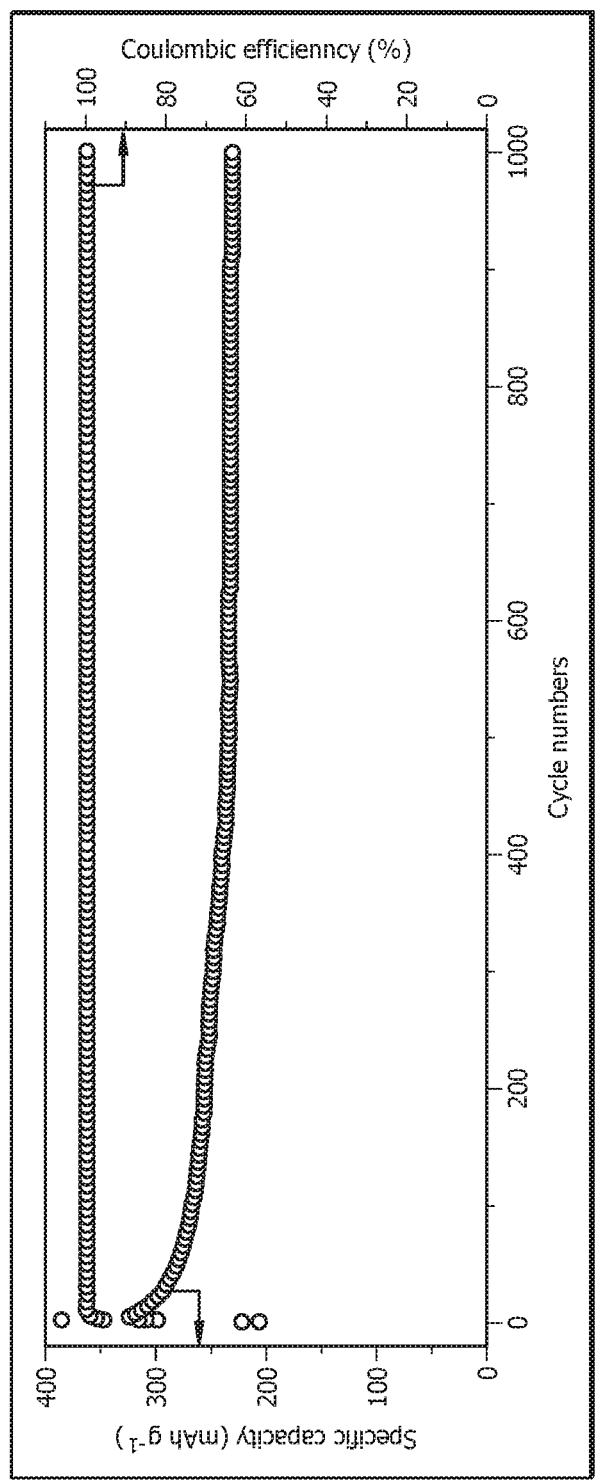
FIG. 2G is a graph showing the long-term cycling performance at a current density of 100 mA/g.
Figure 9A:
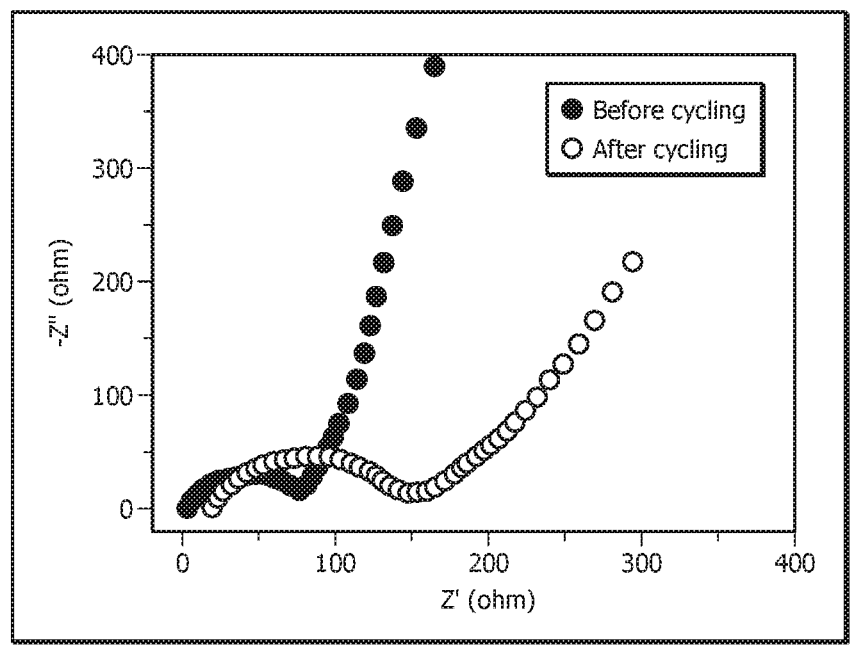
FIG. 9A is a graph showing Nyquist plots of SnS PF before and after a cycling test.
Figure 9B:
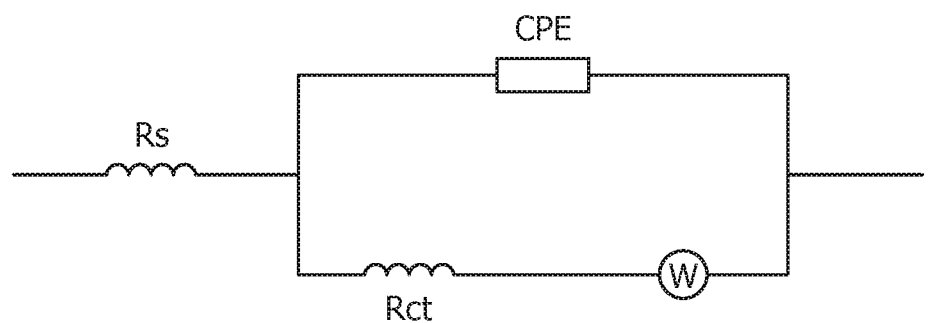
FIG. 9B is a graph showing the equivalent circuit model from the graph of FIG. 9A.
Figure 12:
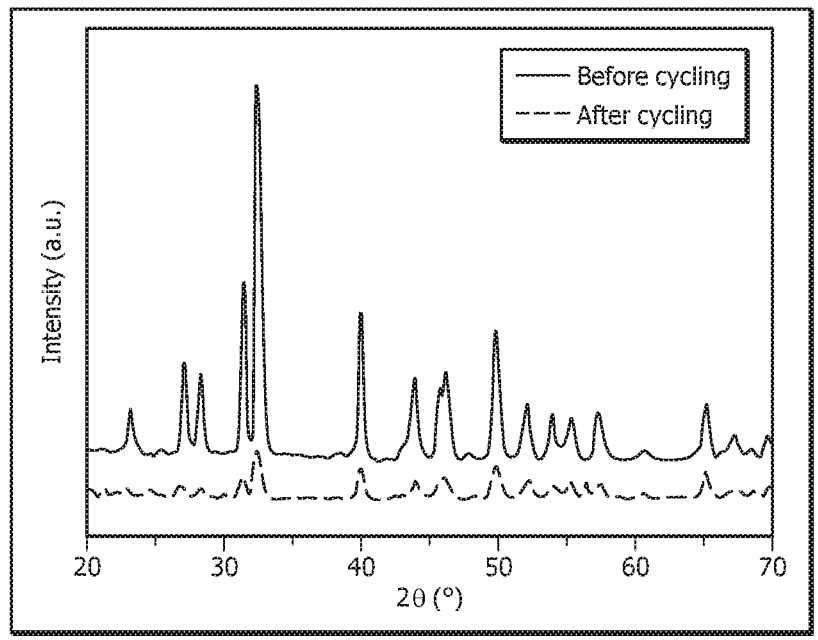
FIG. 12 is a graph showing X-ray diffraction patterns of SnS PF before and after a cycling test.

Energy density and power density are critical parameters in AIBs. The Ragone plot of SnS PF electrode and other similar metal sulfides systems are exhibited in FIG. 2E. [7, 8, 20, 24, 26]. It can be found that SnS PF electrode shows the largest energy density and power density during the similar AIBs. The SnS PF electrode can achieve a high energy density of 269 Wh/kg (Watt-hour per kilogram), due to high operating voltage window and high specific capacity. Electrochemical impedance spectroscopy (EIS) measurements were employed to investigate the kinetics before and after cycling tests. The EIS and equivalent circuit derived from the Nyquist plot is shown in FIG. 9A, with the corresponding circuit shown in FIG. 9B. As illustrated in FIG. 12, it is noted that the bulk solution resistance and charge-transfer resistance increased after 1,000 cycles at 100 mA/g owing to $Al_2Cl_7^-$ or $AlCl_4^-$ ions inserted into the host material. To further understand the electrochemical performance of SnS PF electrode, long-term cyclability behavior was conducted at a current density of 200 mA/g. As shown in FIG. 2G, the as-prepared SnS PF electrode exhibits excellent cycling performance at high current densities. The electrode shows a specific capacity of 227 mAh/g after 1,000 cycles, which means the capacity decay rate is only 0.03% per cycle, presenting good stability. Moreover, the Coulombic efficiency of the electrode was almost 100%, further demonstrating efficient ion insertion/extraction kinetics.

Figure 10:
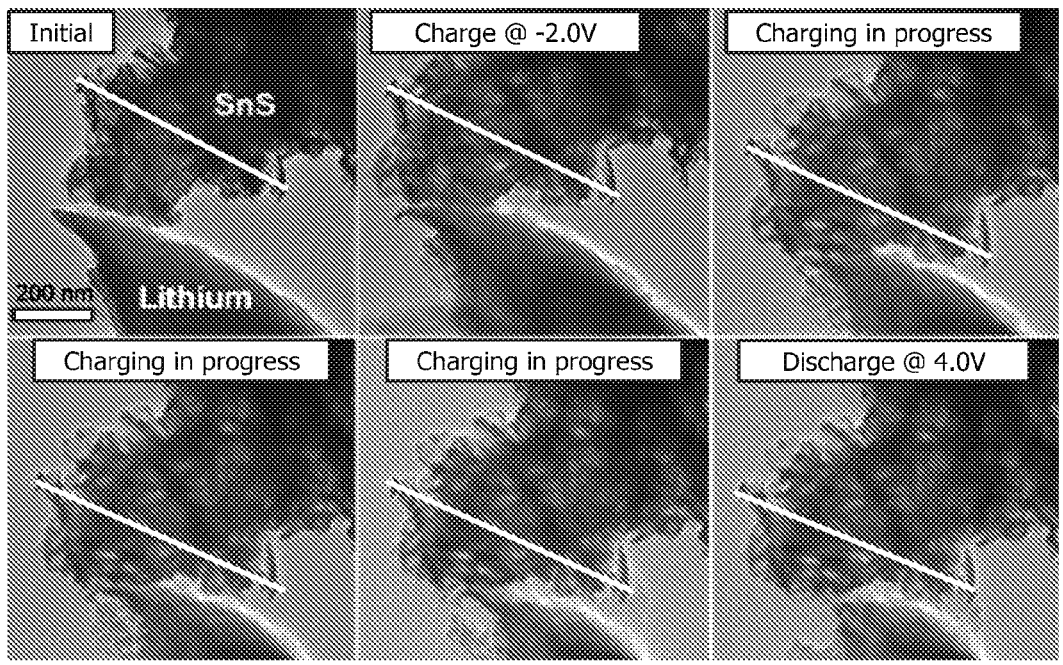
FIG. 10 depicts a series of images showing the microstructure evolution during charge/discharge processes.
Figure 11:
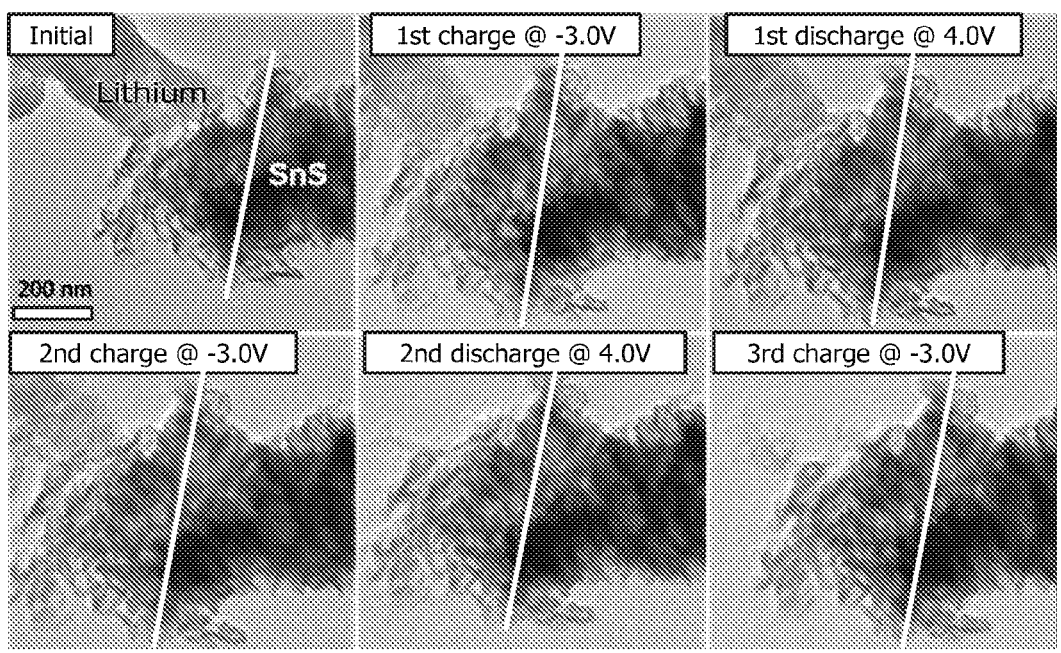
FIG. 11 depicts a series of images showing the microstructure evolution during the first three charge/discharge cycles.

In-situ transmission electron microscopy was performed on the SnS PF to explore the volume expansion during the charge/discharge process. The samples were prepared by scratching the tungsten probe against SnS PF and Li metal, with the samples then being mounted on the holder. Constant voltages at −2.0V and 4.0V were performed on the sample during charge/discharge processes, respectively. FIG. 10 shows the structural changes of SnS PF electrode during the charge/discharge processes. The SnS PF bulged a little bit during the charging process and shrink back during the discharge process, presenting only a small volume expansion during the test. FIG. 2F and FIG. 11 show the structural changes during the first three cycles, where constant voltages of −3.0V and 4.0V were employed in the charge and discharge processes, respectively. A small volume expansion of 12% can be found at the first charge process, then only small contraction and expansion can be seen in the following discharge and charge cycles. This slight structural change is due to the intercalation/extraction of chloroaluminate anions during the charge/discharge processes. Specifically, the SnS PF structure bulged when intercalated chloroaluminate anions were inserted into the SnS interlayers, while the structure shrank back when chloroaluminate anions were extracted from the interlayers. The highly porous structure of SnS PF contributes to such small volume change, which is superior to the conventional AIBs electrodes.

Figure 13A:
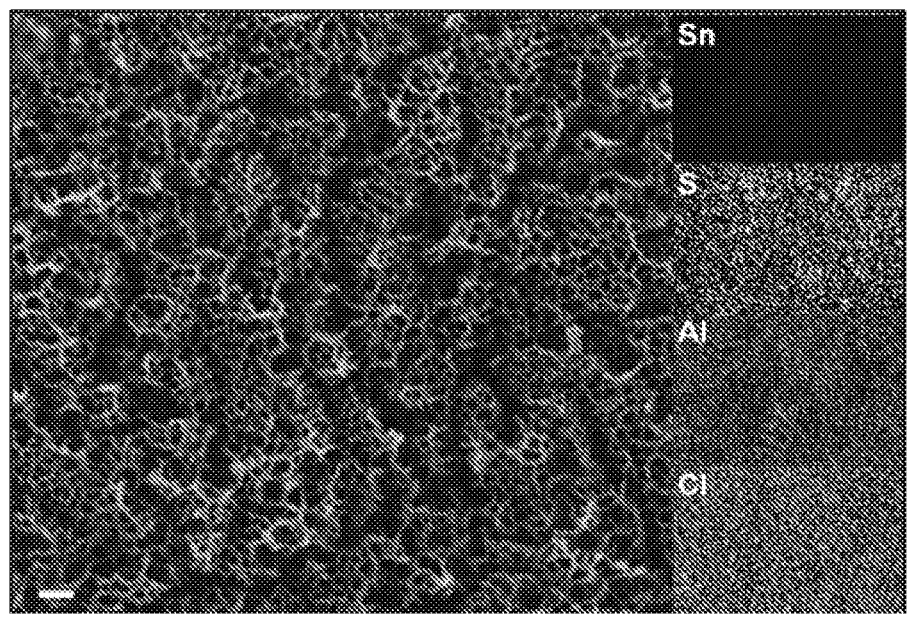
FIG. 13A is a top-view scanning electron microscopy image with corresponding energy-dispersive X-ray spectroscopy (EDS) mapping for Sn, S, Al, and Cl.
Figure 13B:
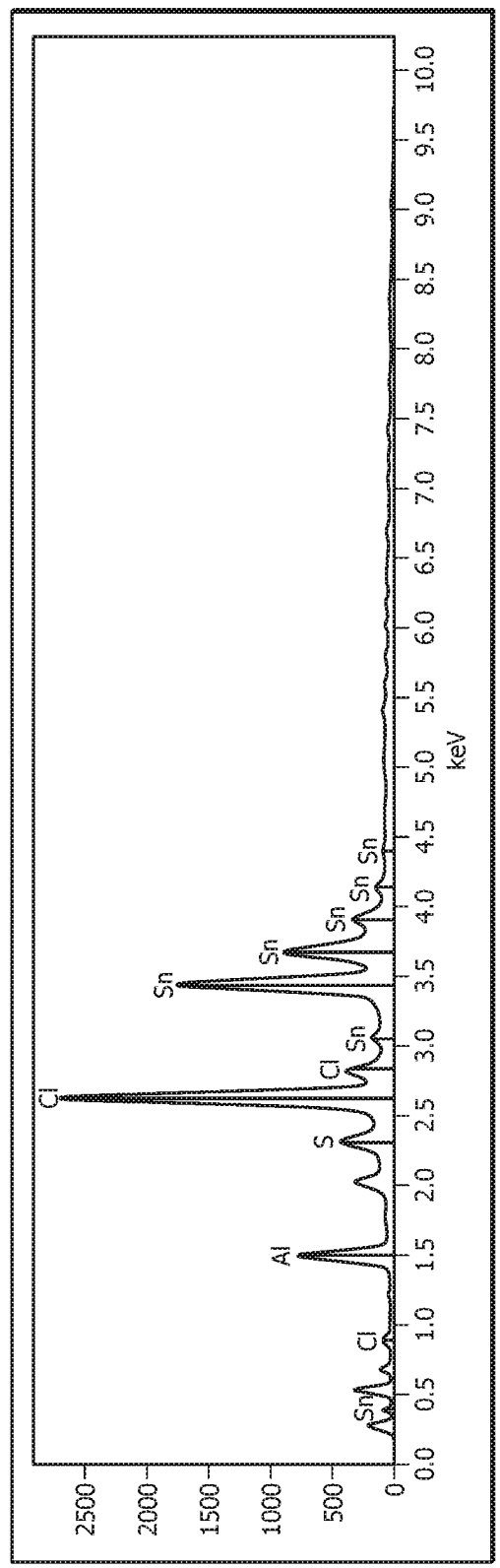
FIG. 13B is a graph showing EDS mapping of the SnS PF after a cycling test.

The morphology and composition of SnS PF after 1,000 cycling tests were examined using x-ray diffraction (XRD) and scanning electron microscopy (SEM) tests. As shown in FIG. 12, all of the XRD peaks after cycling are associated with the peaks before cycling, reflecting excellent stability. It should be pointed out that the intensities of XRD peaks after cycling are weaker than those before cycling, owing to the ion insertion/extraction process. [29]. From the SEM image and graph, as exhibited in FIGS. 13A and 13B, the porous morphology remains stable after the cycling test. Aluminum and chlorine elements from the electrolyte are detected by SEM mapping, which is uniformly distributed in the SnS PF electrode.

Figure 3A:
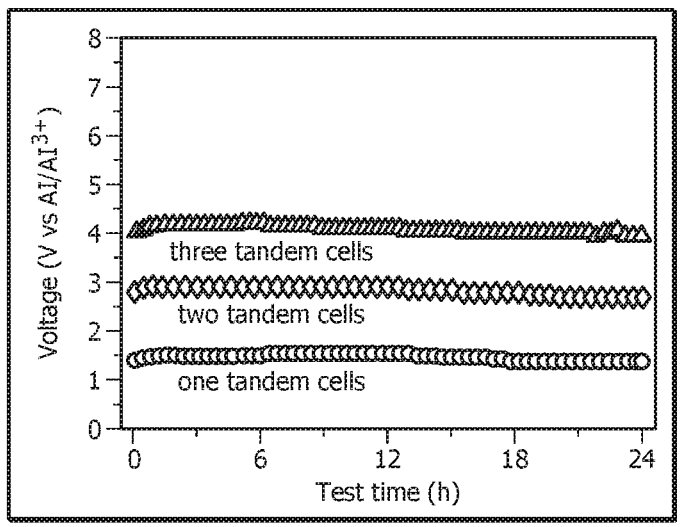
FIG. 3A is a graph showing open circuit voltage tests for one cell, two cells, and three cells.
Figure 3B:
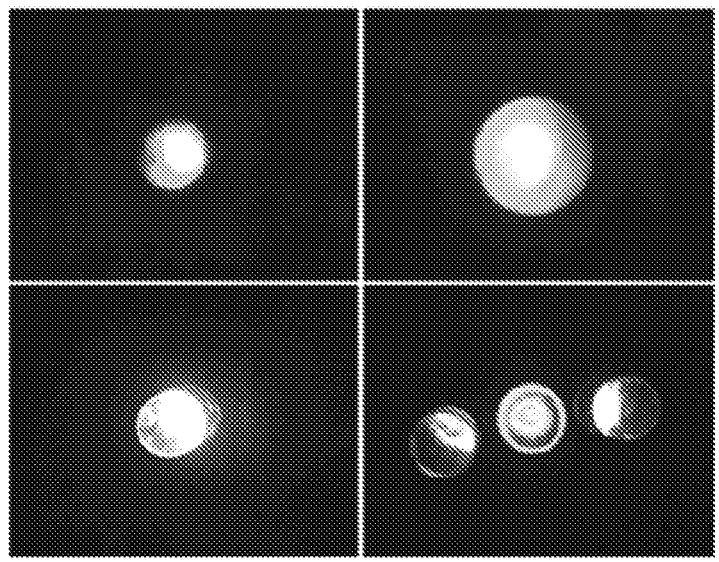
FIG. 3B is an image showing a two-tandem cell illuminating blue, green and white light emitting diodes.

To exploit superior electrochemical performance toward AIB s, open circuit voltage (OCV) was tested for a single cell, two-tandem cells, and three-tandem cells. As shown in FIG. 3A, a single cell, the two-tandem and three-tandem cells possess an OCV of 1.43 V, 2.83 V, and 4.12 V, respectively, providing an efficient way to achieve high output voltage. The two-tandem cells could easily illuminate blue, green, and white light emitting diodes (LEDs), as exhibited in FIG. 3B. Additionally, blue, green, and white LEDs can be lighted up using one two-tandem cell.

Figure 3C:
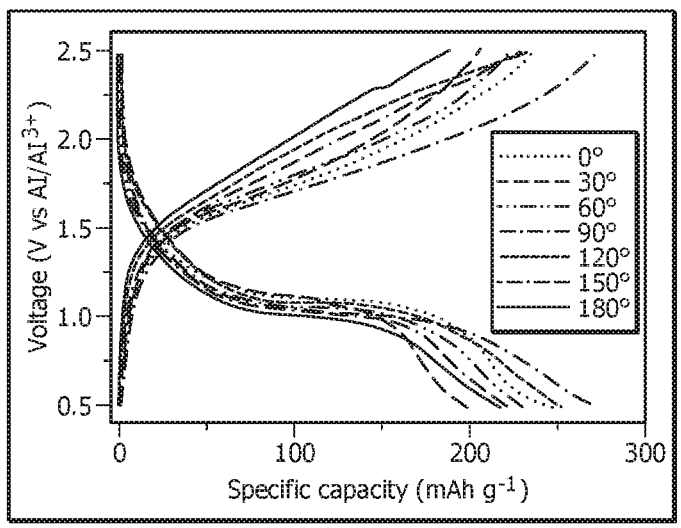
FIG. 3C is a graph showing galvanostatic charge/discharge profiles with different bending angles at a current density of 100 mA/g.
Figure 3D:
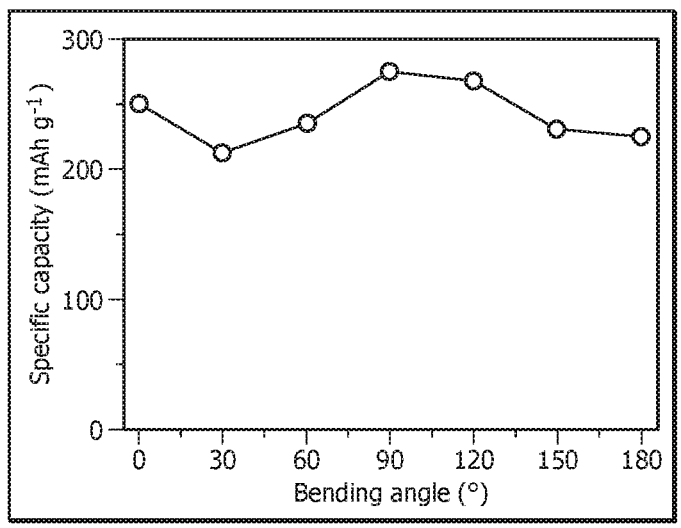
FIG. 3D is a graph showing the specific capacities derived from the graph of FIG. 3C.

Galvanostatic charge/discharge profiles at a current density of 100 mA/g were employed to evaluate the electrochemical performance of SnS PF under bending tests. As depicted in FIG. 3C, the charge/discharge curves reveal a similar shape at different bending angles, suggesting an excellent flexibility. From FIG. 3D, it is found that the specific capacity increases to 110% and 106.8% at bending angles of 90° and 120°, respectively, while the capacity retention was 84.8% at bending angles of 30°, as shown in more detail in Table 2 below.

TABLE 2

| Flexible performance | | | | |
|---|---|---|---|---|
| Bending angle (°) | Specific capacity (mAh/g) | Retention (%) | $R_s$ (Ω) | $R_{ct}$ (Ω) |
| 0 | 250 | — | 19 | 148 |
| 30 | 212 | 84.8 | 19.58 | 140 |
| 60 | 235 | 94 | 19.46 | 124.7 |
| 90 | 275 | 110 | 19.25 | 112.85 |
| 120 | 267 | 106.8 | 19.82 | 123.78 |
| 150 | 230 | 92 | 20.04 | 125.46 |
| 180 | 225 | 90 | 20.64 | 138.96 |

Figure 3E:
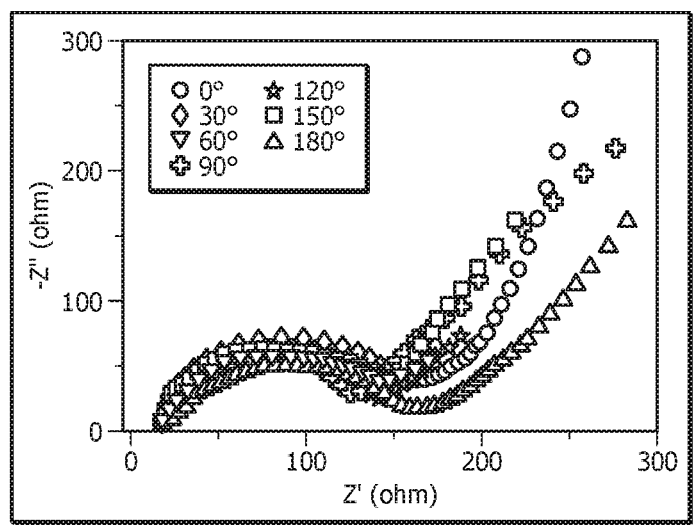
FIG. 3E is a graph showing Nyquist plots with different bending angles.
Figure 3F:
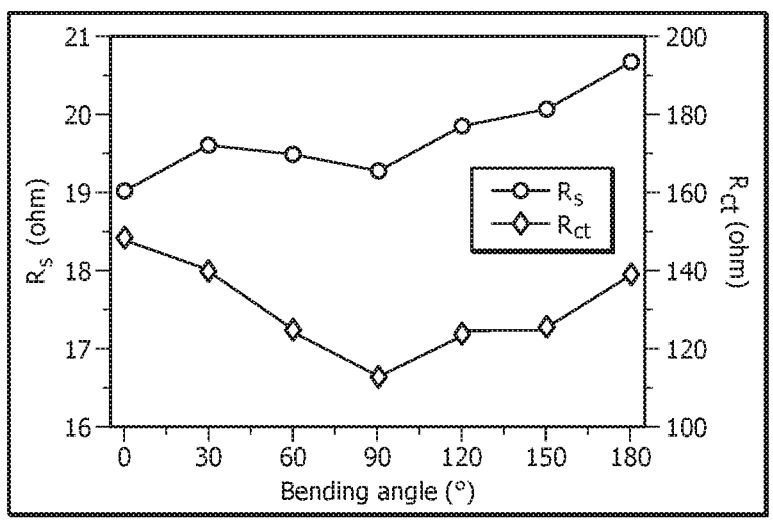
FIG. 3F is a graph showing the charge-transfer resistances derived from the graph of FIG. 3E.
Figure 14A:
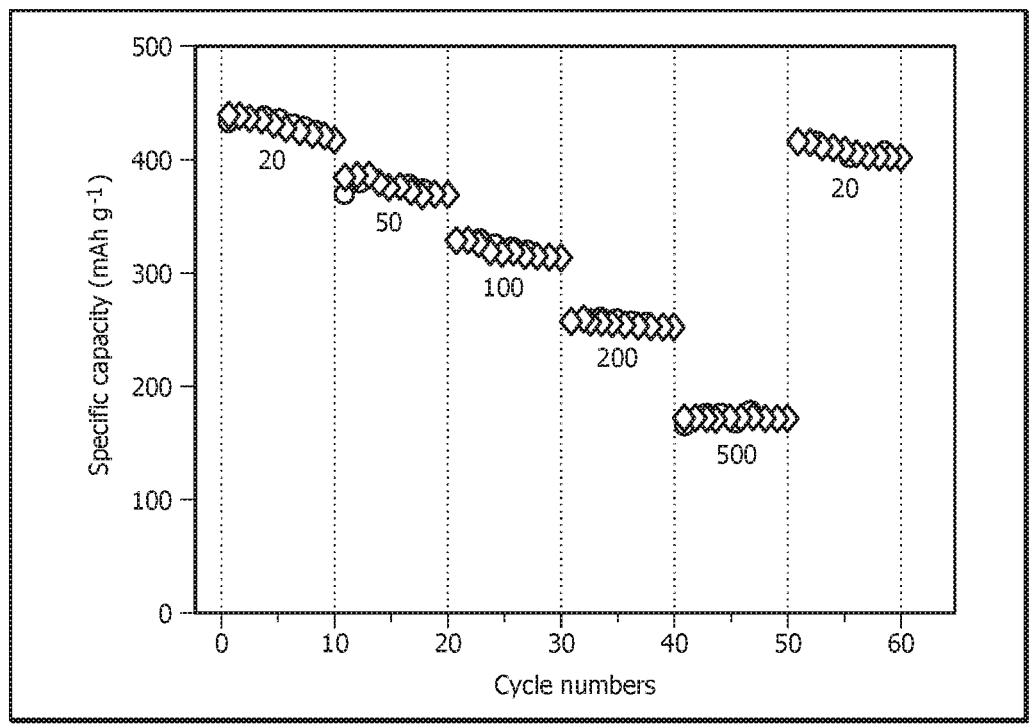
FIG. 14A is a graph showing the static bending electrochemical performance of the SnS PF, particularly showing galvanostatic charge-discharge profiles.
Figure 14B:
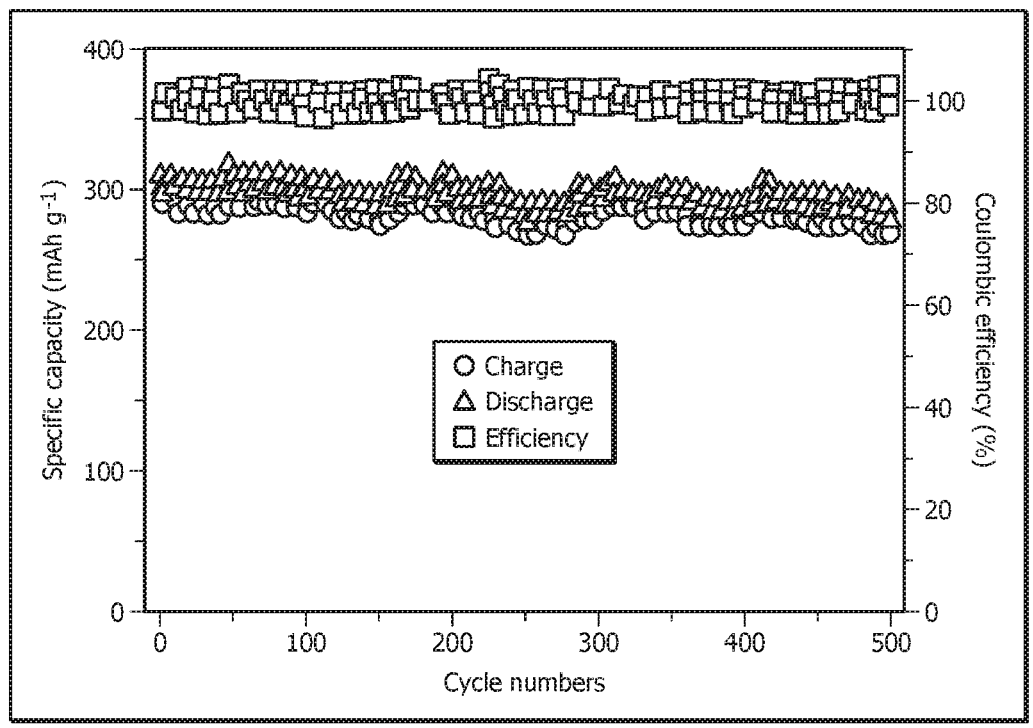
FIG. 14B is a graph showing the static bending electrochemical performance of the SnS PF, particularly showing a long-term cycling test.

In addition, EIS tests were carried out at different bending angles. As exhibited in FIGS. 3E and 3F, the charge-transfer resistance decreases from 148Ω to approximately 112Ω at a bending angle increase from 0° to 90°. The charge-transfer resistance then increases to approximately 138Ω when the bending angle increases to 180°. Rate capability and cycling performance of the SnS PF electrode with static bending at 90° were conducted, as presented in FIGS. 14A and 14B. The SnS PF electrode showed an initial specific capacity of 436 mAh/g at a current density of 20 mA/g, which is higher than that without bending. The specific capacity decreased with the current density increases, but the specific capacity would recover to 415 mAh/g at a current density of 20 mA/g, presenting excellent capability. After the rate capability test, cycling performance was measured at a current density of 100 mA/g. The electrode shows a specific capacity of 281 mAh/g after 500 cycles, which means the capacity decay rate is only 0.02% per cycle, demonstrating superior stability. The increase of specific capacity and decrease of charge-transfer resistance are likely due to the contact between the electrode and the current collector or pressure applied to the pouch cell.

To further investigate the flexible performance, the dynamic bending test was conducted on a programmable lab-made pressing and releasing stage. The pressing and releasing speed can be controlled by changing the rate on the panel. The cyclic voltammetry, galvanostatic charge-discharge profiles, and long-term cyclability were employed to investigate the electrochemical performance under dynamic stretching and releasing processing.

Figure 15A:
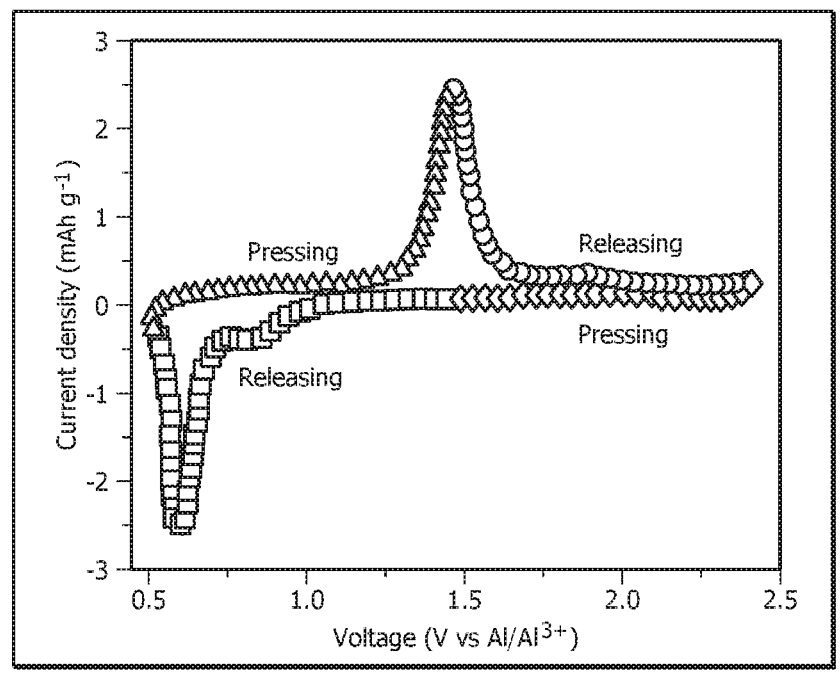
FIG. 15A is a graph showing dynamic electrochemical performance, particularly showing cyclic voltammograms.
Figure 15B:
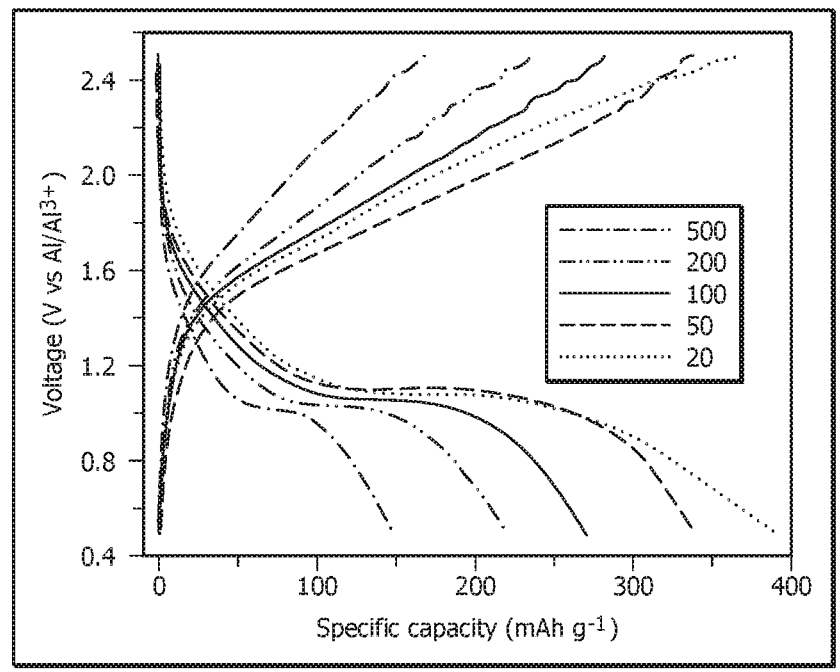
FIG. 15B is a graph showing dynamic electrochemical performance, particularly showing galvanostatic charge-discharge profiles.
Figure 15C:
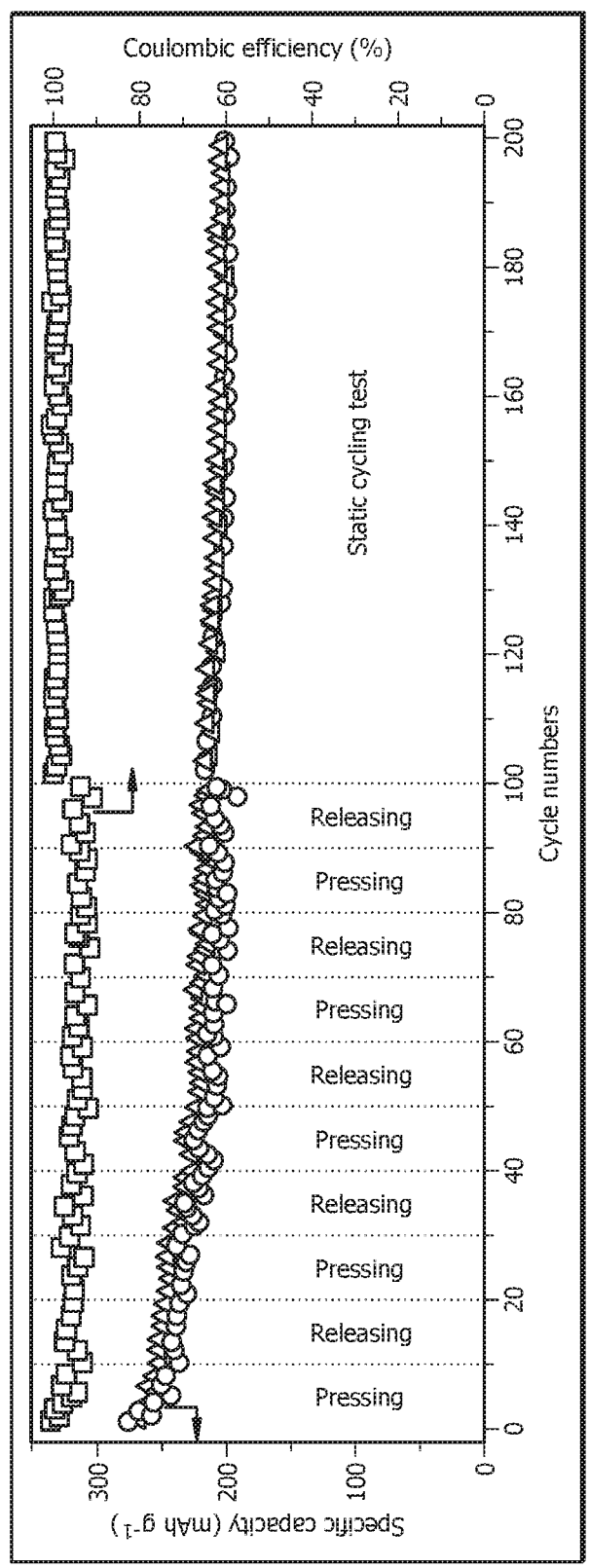
FIG. 15C is a graph showing dynamic electrochemical performance, particularly showing a long-term cycling test.

Cyclic voltammetry (CV) of the as-prepared electrode at a scanning rate of 0.5 mV/s under dynamic stretching and releasing processing is shown in FIG. 15A. It is clearly noted that the CV curves maintained similar shape under static and dynamic testing, demonstrating that the as-prepared SnS PF keeps stable during dynamic pressing and releasing processing. The dynamic electrochemical behavior under galvanostatic charge-discharge testing was conducted at different current densities, as exhibited in FIG. 15B. The charge and discharge curves were recorded under pressing and releasing processing, respectively. The dynamic charge-discharge curves presented similar shape with the static charge-discharge curves, and the specific capacities of 386 mAh/g are still acceptable, reflecting there is no significant effect from the dynamic bending. However, it is pointed out that the Coulombic efficiency at a high current density (>100 mA/g) is lower than that at small current density. The dynamic cycling stability at a current density of 100 mA/g was examined in FIG. 15C. Remarkably, the SnS PF exhibited excellent cycling performance during dynamic bending; for example, 82% retention was achieved after 100 cycles. More importantly, the Coulombic efficiency was almost 95%, indicating high-efficient ion insertion/extraction kinetics. After dynamic testing, the static cycling test was performed, achieving 94% retention and almost 100% Coulombic efficiency after 100 cycles, demonstrating superior stability. From the above results, the as-prepared SnS PF presents superior dynamic electrochemical performance as AIB s. This research provides a promising flexible energy system to satisfy the requirements of critical flexible electronics in the future.

In summary, a self-supported SnS electrode with a highly porous structure was developed to enhance the mechanical and electrochemical performance for AIB s. As a consequence, the SnS PF delivers a high capacity of 406 mAh/g and a capacity decay rate of 0.03% per cycle, which is superior to the state-of-the-art AIBs electrodes. The superior dynamic and static electrochemical behavior and excellent cycling performance demonstrate a promising candidate for energy storage and conversion applications Experimental Method and Results The Sn deposit was fabricated through electrochemical deposition. Briefly, in a typical process, 0.5 M $SnSO_4$, 1 M $H_2SO_4$, 0.5 M NaF, and 0.1 M $Na_2SO_4$ were dissolved in deionized water to form an aqueous solution. After that, 0.05 M nitrilotriacetic acid ($N(CH_2CO_2H)_3$) was added to the aqueous solution as an additive. The prepared solution was stirred for 30 mins in ambient temperature. A two-electrode deposition system with polished Sn foil as a cathode (0.02 mm thick) and Sn plate (3 mm thick) as an anode was employed to deposit Sn film. The cathode current density was controlled at 25 $mA/cm^2$ to carry out the electrochemical deposition for six hours. A self-supported Sn film can be obtained after peeling the deposit from the Sn foil substrate. After that, electrochemical anodization was conducted with a constant voltage of 9 V for 30 min in an electrolyte of 0.05 M oxalic acid aqueous solution. The as-prepared sample was washed with deionized water and ethanol for three times, then dried under air flow. The sulfuration process was performed in a chemical vapor deposition system with two heating zones. Briefly, sulfur powder and anodized $SnO_2$ film were placed at the upstream and downstream heating zones, respectively. The tube was evacuated to a low pressure of 20 mTorr (millitorr) for 30 min and purged with high pure $N_2$ to remove the residual air. Then, upstream and downstream heating zones were heated to 150° C. and 350° C., respectively. The sulfuration treatment was controlled for 30 mins with $N_2$ (at a mass flow rate of 100 sccm, or standard cubic centimeters per minute) as a carrier gas, followed by natural cooling.

To test the electrical conductivity of the as-prepared Sn PF and control Sn PF samples with different charge/discharge potentials, various conductivity meters, diffractometers, scanning tunneling microscopes, and other machines were used. Samples were prepared by scratching a tungsten probe against the deposited SnS coating, and the samples are mounted on a holder. On the manipulator end, a tungsten rod is scratched on the lithium metal. The lithium metal was transferred to the tungsten probe inside the glovebox for minimum exposure of lithium to the atmosphere. Lithiation (charging) was performed by contacting the tungsten rod with the lithium on the $SnS_2$ and applying -2.0 V with respect to the lithium. Delithiation was performed at 4.0 V.

To take the electrochemical measurements, a room temperature ionic-liquid (IL) electrolyte was prepared by mixing 1-ethyl-3-methylimidazolium chloride ([EMIm]Cl) and anhydrous $AlCl_3$ in an argon-filled glove box ($c_{O_2}$<0.1 ppm and $c_{H_2O}$<0.1 ppm). Briefly, [EMIm]Cl was heated at 110° C. to obtain a light-yellow and transparent liquid, then stirred for one hour. subsequently, anhydrous $AlCl_3$ powder was slowly added into [EMIm]Cl solution and the molar ratio between $AlCl_3$ and [EMIm]Cl was set to 1.3:1. After stirring for 12 hours, a brown and transparent electrolyte was obtained. The electrochemical performance of the as-prepared SnS PF was evaluated by assembling a soft pouch cell with polished aluminum foil as anode material. Two pieces of GF/D glass fibers were attached together as separator. An electrochemical workstation was employed to test cyclic voltammetry and electrochemical impedance spectroscopy with frequency between 10 mHz and 100 kHz. The operating voltage window was set at 0.5-2.42 V. Galvanostatic charge/discharge profiles were collected using a multiple channel system.

REFERENCES

[1] J. Li, K. Xie, Y. Lai, Z. A. Zhang, F. Li, X. Hao, X. Chen, Y. Liu, *J. Power Sources* 2010, 195, 5344; Y. Wang, Z. Y. He, J. J. Chen, K. Liang, K. Marcus, Z. S. Feng, *Mater. Lett.* 2017, 196, 4; V. Etacheri, R. Marom, R. Elazari, G. Salitra, D. Aurbach, *Energy Environ. Sci.* 2011, 4, 3243.

[2] K. Liang, K. Marcus, S. Zhang, L. Zhou, Y. Li, S. T. De Oliveira, N. Orlovskaya, Y. H. Sohn, Y. Yang, *Adv. Energy Mater.* 2017, 7, 1701309.

[3] N. Nitta, F. Wu, J. T. Lee, G. Yushin, *Mater. Today* 2015, 18, 252.

[4] J. B. Goodenough, K. S. Park, J. Am. Chem. Soc. 2013, 135, 1167; D. H. Doughty, E. P. Roth, *Electrochem. Soc. Interface* 2012, 21, 37.

[5] H. D. Yoo, I. Shterenberg, Y. Gofer, G. Gershinsky, N. Pour, D. Aurbach, *Energy Environ. Sci.* 2013, 6, 2265; E. Levi, Y. Gofer, D. Aurbach, *Chem. Mater.* 2009, 22, 860; K. Liang, K. Marcus, L. Guo, Z. Li, L. Zhou, Y. Li, S. De Oliveira, N. Orlovskaya, Y. H. Sohn, Y. Yang, *Chem. Commun.* 2017, 53, 7608.

[6] M. C. Lin, M. Gong, B. Lu, Y. Wu, D. Y. Wang, M. Guan, M. Angell, C. Chen, J. Yang, B. J. Hwang, *Nature* 2015, 520, 324.

[7] S. Wang, Z. Yu, J. Tu, J. Wang, D. Tian, Y. Liu, S. Jiao, *Adv. Energy Mater.* 2016, 6, 1600137.

[8] D. Y. Wang, C. Y. Wei, M. C. Lin, C. J. Pan, H. L. Chou, H. A. Chen, M. Gong, Y. Wu, C. Yuan, M. Angell, Y. J. Hsieh, Y. H. Chen, C. Y. Wen, C. W. Chen, B. J. Hwang, C. C. Chen, H. Dai, *Nat. Commun.* 2017, 8, 14283.

[9] S. Liu, G. Pan, G. Li, X. Gao, *J. Mater. Chem. A* 2015, 3, 959.

[10] S. Liu, J. Hu, N. Yan, G. Pan, G. Li, X. Gao, *Energy Environ. Sci.* 2012, 5, 9743; Y. J. He, J. F. Peng, W. Chu, Y. Z. Li, D. G. Tong, *J. Mater. Chem. A* 2014, 2, 1721.

[11] J. V. Rani, V. Kanakaiah, T. Dadmal, M. S. Rao, S. Bhavanarushi, *J. Electrochem. Soc.* 2013, 160, A1781; L. D. Reed, E. Menke, *J. Electrochem. Soc.* 2013, 160, A915.

[12] J. Liu, Y. Wen, P. A. van Aken, J. Maier, Y. Yu, *J. Mater. Chem. A* 2015, 3, 5259; C. Zhu, P. Kopold, W. Li, P. A. van Aken, J. Maier, Y. Yu, Adv. Sci. 2015, 2, 1500200.

[13] Z. Deng, D. Cao, J. He, S. Lin, S. M. Lindsay, Y. Liu, *ACS Nano* 2012, 6, 6197; Y. Zhang, J. Lu, S. Shen, H. Xu, Q. Wang, *Chem. Commun.* 2011, 47, 5226.
[14] T. Zhou, W. K. Pang, C. Zhang, J. Yang, Z. Chen, H. K. Liu, Z. Guo, *ACS Nano* 2014, 8, 8323.
[15] M. Nassary, *J. Alloys Compd.* 2005, 398, 21.
[16] G. Gao, L. Yu, H. B. Wu, Small 2014, 10, 1741; P. Sinsermsuksakul, J. Heo, W. Noh, A. S. Hock, R. G. Gordon, *Adv. Energy Mater.* 2011, 1, 1116.
[17] J. Henry, K. Mohanraj, S. Kannan, S. Barathan, G. Sivakumar, Eur. Phys. *J. Appl. Phys.* 2013, 61, 10301.
[18] J. Qu, Y. X. Yin, Y. Q. Wang, Y. Yan, Y. G. Guo, W. G. Song, *ACS Appl. Mater. Interfaces* 2013, 5, 3932.
[19] Y. Song, S. Jiao, J. Tu, J. Wang, Y. Liu, H. Jiao, X. Mao, Z. Guo, D. J. Fray, *J. Mater. Chem.* A 2017, 5, 1282.
[20] Y. Hu, B. Luo, D. Ye, X. Zhu, M. Lyu, L. Wang, *Adv. Mater.* 2017, 29, 1606132.
[21] T. Cai, L. Zhao, H. Hu, T. Li, X. Li, S. Guo, Y. Li, Q. Xue, W. Xing, Z. F. Yan, *Energy Environ. Sci.* 2018, 11, 2341.
[22] F. Wang, F. Yu, X. Wang, Z. Chang, L. Fu, Y. Zhu, Z. Wen, Y. Wu, W. Huang, *ACS Appl. Mater. Interfaces* 2016, 8, 9022.
[23] S. Li, J. Zheng, S. Zuo, Z. Wu, P. Yan, F. Pan, *RSC Adv.* 2015, 5, 46941.
[24] Y. Hu, D. Ye, B. Luo, H. Hu, X. Zhu, S. Wang, L. Li, S. Peng, L. Wang, *Adv. Mater.* 2018, 30, 1703824.
[25] S. Wang, S. Jiao, J. Wang, H. S. Chen, D. Tian, H. Lei, D. N. Fang, *ACS Nano* 2016, 11, 469.
[26] Z. Yu, Z. Kang, Z. Hu, J. Lu, Z. Zhou, S. Jiao, *Chem. Commun.* 2016, 52, 10427.
[27] X. Zhang, S. Wang, J. Tu, G. Zhang, S. Li, D. Tian, S. Jiao, *ChemSusChem* 2018, 11, 709.
[28] T. Gao, X. Ji, S. Hou, X. Fan, X. Li, C. Yang, F. Han, F. Wang, J. Jiang, K. Xu, *Adv. Mater.* 2018, 30, 1704313.
[29] S. Hu, W. Chen, J. Zhou, F. Yin, E. Uchaker, Q. Zhang, G. Cao, *J. Mater. Chem.* A 2014, 2, 7862; S. Aryal, E. V. Timofeeva, C. U. Segre, *J. Electrochem. Soc.* 2018, 165, A71; P. Moss, G. Au, E. Plichta, J. Zheng, *J. Electrochem. Soc.* 2010, 157, A1.
[30] H. Sun, W. Wang, Z. Yu, Y. Yuan, S. Wang, S. Jiao, *Chem. Commun.* 2015, 51, 11892.
[31] X. Yu, B. Wang, D. Gong, Z. Xu, B. Lu, *Adv. Mater.* 2017, 29, 1604118.
[32] J. Jiang, H. Li, J. Huang, K. Li, J. Zeng, Y. Yang, J. Li, Y. Wang, J. Wang, J. Zhao, *ACS Appl. Mater. Interfaces* 2017, 9, 28486.
[33] L. Zhang, L. Chen, H. Luo, X. Zhou, Z. Liu, *Adv. Energy Mater.* 2017, 7, 1700034.
[34] H. Chen, F. Guo, Y. Liu, T. Huang, B. Zheng, N. Ananth, Z. Xu, W. Gao, C. Gao, *Adv. Mater.* 2017, 29, 1605958.
[35] J. Tu, H. Lei, Z. Yu, S. Jiao, *Chem. Commun.* 2018, 54, 1343.
[36] W. Kaveevivitchai, A. Huq, S. Wang, M. J. Park, A. Manthiram, *Small* 2017, 13, 1701296.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of forming a flexible electrode comprising the steps of:
   electrochemically depositing a tin (Sn) film onto a polished Sn foil for a predetermined length of time;
   removing the electrochemically deposited Sn film from the polished Sn foil, such that the electrochemically deposited Sn film is a self-supported Sn film;
   performing an electrochemical anodic treatment of the self-supported Sn film, the treatment including the steps of subjecting the self-supported Sn film to a constant voltage for a period of approximately thirty minutes;
   forming a self-supported tin oxide ($SnO_2$) porous film from the self-supported Sn film during the step of performing the electrochemical anodic treatment; and
   performing a chemical vapor deposition treatment on the self-supported $SnO_2$ porous film, the treatment including the steps of:
   disposing the self-supported $SnO_2$ porous film in an atmosphere of sulfur (S) for a period of approximately thirty minutes; and
   forming a self-supported tin (II) sulfide (SnS) porous film from the self-supported $SnO_2$ porous film.

2. The method of claim 1, wherein the formed self-supported SnS porous film has a thickness in a range of 0.1-100 μm.

3. The method of claim 1, wherein the formed self-supported SnS porous film has an electrical conductivity of 0.606 S/cm.

4. The method of claim 1, wherein the constant voltage is approximately nine volts.

5. The method of claim 1, wherein the predetermined length of time is approximately six hours.

6. The method of claim 1, wherein the step of electrochemically depositing the tin (Sn) film onto the polished Sn foil for the predetermined length of time further comprises forming an aqueous solution as a medium within which electrochemical deposit occurs.

7. The method of claim 1, wherein the step of electrochemically depositing the tin (Sn) film onto the polished Sn foil for the predetermined length of time further comprises forming a two-electrode deposition system including the polished Sn foil as a cathode and a Sn plate as an anode.

8. The method of claim 1, wherein the step of performing the chemical vapor deposition treatment on the self-supported $SnO_2$ porous film further comprises forming an upstream heating zone and a downstream heating zone, disposing an amount of sulfur powder at the upstream heating zone, and disposing the self-supported $SnO_2$ porous film at the downstream heating zone.

9. The method of claim 8, further comprising the steps of heating the upstream heating zone to 150° C., and heating the downstream heating zone to 350° C.

10. A flexible aluminum-ion battery comprising:
    a tin (II) sulfide (SnS) porous film as an electrode within the flexible aluminum-ion battery;
    the SnS porous film of the flexible battery having a reversible specific capacity of 406 mAh/g, such that ion diffusion within the flexible aluminum-ion battery is faster than ion-diffusion within aluminum-ion batteries without the SnS porous film;
wherein the flexible aluminum-ion battery is non-rigid, such that the flexible aluminum-ion battery is capable of bending.

11. The flexible aluminum-ion battery of claim 10, wherein the SnS porous film has a thickness of approximately 2.3 μm.

12. The flexible aluminum-ion battery of claim 10, wherein the flexible aluminum-ion battery is capable of bending to form a 90° angle.

13. A method of improving aluminum-ion battery performance comprising the steps of:
electrochemically depositing a tin (Sn) film onto a polished Sn foil for a predetermined length of time;
removing the electrochemically deposited Sn film from the polished Sn foil, such that the electrochemically deposited Sn film is a self-supported Sn film;
performing an electrochemical anodic treatment of the self-supported Sn film, the treatment including the steps of subjecting the self-supported Sn film to a constant voltage for a period of approximately thirty minutes;
forming a self-supported tin oxide ($SnO_2$) porous film from the self-supported Sn film during the step of performing the electrochemical anodic treatment;
performing a chemical vapor deposition treatment on the self-supported $SnO_2$ porous film, the treatment including the steps of:
disposing the self-supported $SnO_2$ porous film in an atmosphere of sulfur (S) for a period of approximately thirty minutes; and
forming a self-supported tin (II) sulfide (SnS) porous film from the self-supported $SnO_2$ porous film; and
disposing the self-supported SnS porous film within a non-rigid aluminum-ion battery as an electrode,
wherein ion diffusion within the aluminum-ion battery is faster than ion-diffusion within aluminum-ion batteries without the SnS porous film, and
wherein the non-rigidity of the aluminum-ion battery is such that the battery is capable of flexing.

14. The method of claim 13, wherein the step of electrochemically depositing the tin (Sn) film onto the polished Sn foil for the predetermined length of time further comprises forming a two-electrode deposition system including the polished Sn foil as a cathode and a Sn plate as an anode.

15. The method of claim 13, further comprising a step of bending each of the aluminum-ion battery and the SnS porous film to 90°.

* * * * *

UNITED STATES PATENT AND TRADEMARK OFFICE
CERTIFICATE OF CORRECTION

| | | |
|---|---|---|
| PATENT NO. | : 11,177,473 B2 | Page 1 of 1 |
| APPLICATION NO. | : 15/929608 | |
| DATED | : November 16, 2021 | |
| INVENTOR(S) | : Yang | |

It is certified that error appears in the above-identified patent and that said Letters Patent is hereby corrected as shown below:

In the Claims

Column 14, Claim 10, Line 66 should read:
the SnS porous film of the flexible aluminum-ion battery having a Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*